(12) United States Patent
Goldberg

(10) Patent No.: US 7,469,219 B2
(45) Date of Patent: Dec. 23, 2008

(54) ORDER MANAGEMENT SYSTEM

(75) Inventor: Nathan D. Goldberg, Lonetree, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 474 days.

(21) Appl. No.: 10/879,368

(22) Filed: Jun. 28, 2004

(65) Prior Publication Data

US 2005/0289013 A1   Dec. 29, 2005

(51) Int. Cl.
 *G06Q 30/00* (2006.01)
(52) U.S. Cl. .............. 705/26; 705/28; 705/1; 705/40; 700/14
(58) Field of Classification Search .......... 705/26, 705/28, 1, 40; 235/378; 700/14
See application file for complete search history.

(56) References Cited

U.S. PATENT DOCUMENTS

| | | | | |
|---|---|---|---|---|
| 5,878,344 | A * | 3/1999 | Zicker | 455/426.1 |
| 6,862,573 | B2 * | 3/2005 | Kendall et al. | 705/7 |
| 7,155,701 | B1 * | 12/2006 | Gongwer et al. | 717/106 |
| 7,177,825 | B1 * | 2/2007 | Borders et al. | 705/26 |
| 2002/0007321 | A1 * | 1/2002 | Burton | 705/26 |
| 2002/0160772 | A1 | 10/2002 | Gailey et al. | 455/428 |

FOREIGN PATENT DOCUMENTS

| WO | WO 99/14688 A2 | 3/1999 |
|---|---|---|
| WO | WO 02/073331 A2 | 9/2002 |

OTHER PUBLICATIONS

"Stochastic Machine Minimization With Constant Service Times" □□Authors: Coffman EG; Flatto L; Wright PE□□Corporate Source: AT&T Bell Labs/Murray Hill/NJ/07974□□Journal: Mathematics of Operations Research, 1993, V18, N12 (May), P300-316□□ISSN: 0364-765X.*

* cited by examiner

*Primary Examiner*—F. Zeender
*Assistant Examiner*—Luna Champagne
(74) *Attorney, Agent, or Firm*—Brinks Hofer Gilson & Lione

(57) ABSTRACT

A system for managing orders for products, including goods and services, which dynamically creates processes for providing those products has been developed. This order management system creates the processes from pre-defined tasks when the order is received. By operating in this manner, the order management system dynamically creates processes, even for new or changed products and services, and provides a foundation for the process automation and the human workflow that may be required to provision an order. The order management system may include a database, which includes a data structure that enables the functionality of the order manager and stores information relating to products, building blocks, and tasks, including the relationships among the products, building blocks, and tasks. The data structure generally includes a task entity class, a building block entity class, and an order mapping entity class.

21 Claims, 15 Drawing Sheets

ORDER MANAGEMENT SYSTEM

BACKGROUND

In today's competitive marketplace, providers of products are seeking to improve their financial performance by driving down costs, increasing revenue and ensuring continued customer satisfaction through rapid rollout of complex products, accurate and timely product provision and ongoing, robust service management. In some industries, such as the telecommunications industry, research has shown that inaccurate or delayed service activation, resulting from inefficient operations and manually-intensive processes, is a primary cause of low customer satisfaction. It is not uncommon to see orders for complex services experience an order fallout rate in excess of 80%. Therefore, a focus on continued customer satisfaction is extremely likely to yield an increase in financial performance. However, implementing this strategy has been difficult due to the complex and data-intensive processes required to provide accurate and timely products.

Computer automation offers the possibility of completely automating such complex processes. Some automation of these processes can be achieved through the use of pre-packaged applications or legacy systems. Pre-packaged applications are relatively inexpensive and easy to implement. However, pre-packaged applications often do not provide processes that fit the specific needs of a particular product, industry, or company. In addition, the processes offered by these pre-packaged applications are generally inflexible and therefore, very difficult to change with changing requirements. In contrast, legacy systems provide custom processes that are designed for a particular need. However, legacy systems are relatively expensive and time consuming to create and implement, and once implemented, may be just as inflexible as pre-packaged applications.

Neither pre-packaged applications nor legacy systems provide the flexibility needed to create processes for provisioning new products. Both these systems provide hard-wired solutions that need to be reprogrammed to reflect process changes. Further, neither pre-packaged applications nor legacy systems adequately address the issue that many processes can not be handled by a single application. For example, a process for fulfilling an order for products may require one application to capture customer information, another to capture the order itself, another to arrange for shipping the order, and yet another for billing the customer. In addition, applications may be needed for purchasing and inventory. More often than not, these different applications cannot communicate with each other, and information entered into one system generally needs to be reentered into each of the other systems. Further, neither pre-packaged applications nor legacy systems adequately address the issue that some processes include steps that require human intervention. For example, an order for a custom part or service usually requires that some portion of the process for fulfilling the order be addressed manually because the steps required for fulfilling a particular custom order may not be provided by the existing process.

In order to provide some customization and integration, the methodologies of business process management ("BPM") have been used to automate processes for provisioning orders. As used in this document "order" refers to a request for products, including goods, services or a combination of goods and services. In addition, "provision" refers to the activities involved in and related to providing products to the entity that placed the order. While previous solutions, such as pre-packaged and legacy systems, were based on a document-centric approach, BPM is based on a process-centric approach. BPM separates the management of processes into an independent layer that is separate from the underlying applications. This "independent process layer" or "IPL" enables a view of all the activities necessary to execute a particular business process, and the management of these activities even if the activities involve different applications, people or both. The IPL may generally be created using a process management tool within a framework such as an enterprise integration ("EI") framework.

In the IPL, processes may be created and stored. For example, if a BPM approach is used to implement a system for processing orders, separate processes for receiving the order, identifying the desired products, and providing each of the desired products may all be created in the IPL and stored. When an order is received from a customer and enters a BPM system, the IPL identifies the products included in the order, and selects from the stored processes those processes that are designed to provide the identified products to the customer. The processes are hardcoded into the BPM application.

Although process management tools using a BPM approach enable process automation that is more customizable than enabled by pre-packaged systems and less time consuming and expensive to implement than enabled by legacy systems, such tools do not supply the flexibility required to capture and implement processes as they change with time. Further, BPM systems may be quite inefficient. For example, to enable processes for provisioning products, the processes need to include steps designed to handle any product variation or circumstance that may arise. However, for a given order, not all the steps included in a given process may be needed.

Businesses, and therefore processes enabling business, change all the time and are becoming more volatile. Moreover, as the Internet and other networks are used to link systems, people and organizations together, longer, more complicated, integrated and dynamic processes are necessary. For example, it is very common for a product provider to periodically offer new products, and to discontinue or change existing products. If the provider uses a BPM system to provide these products, each time a new good or service is added, a new process for providing that product must be created and added to the IPL. Likewise, each time an existing product is changed, the process for providing that good or service must be changed in the IPL. Adding or changing the processes in a BPM system may require significant software reprogramming. Such programming can consume considerable time and resources, which negatively affects the efficiency, reliability and responsiveness of the BPM system. The need to reprogram software to accommodate process changes creates a particular technical problem requiring solution.

BRIEF SUMMARY

A system for managing orders for products, including goods and services, which dynamically creates processes for providing those products has been developed (an "order management system"). The order management system creates the processes from pre-defined tasks when the order is received. By operating in this manner, the order management system can dynamically create processes, even for new or changed products and services, and provides a foundation for the process automation and the human workflow that may be required to provision an order.

In one embodiment, the order management system includes an order generation system, an order manager, and an automatic order processing system. In general the order management system receives an order, decomposes the order into its components or building blocks to create a building block list, and maps the building block list to one or more tasks to create a task list for each component. The order management system then uses this task list to process the order.

The order manager provides a link among the order generation system, and the automatic order processing systems, some or all of which may include disparate systems. In addition to integrating the other components of the order management system, the order manager effectively and efficiently manages order provisioning and dynamically creates processes from pre-defined tasks in response to orders received from the order generation system. The order manager may manage these processes, or some of the tasks included in the processes, for manual provisioning or communication to the automatic order processing system for automatic provisioning.

The order manager generally includes a process creation module, a process management module, a database, and a manual task processing system. The order manager may also include a jeopardy module, a report engine, an exception system, or any combination of the foregoing.

The database may include a reference data database. The reference data database generally includes a data structure that enables the functionality of the order manager. The data structure generally includes a task entity class, a building block entity class, and an order mapping entity class. The data structure allows information relating to products, building blocks, and tasks, including the relationships among the products, building blocks, and tasks to be stored. The data structure further allows the building blocks to be used to define products, and to link the products included in an order to the tasks needed to provision those products. By using building blocks in this manner, the data structure allows new products to be added and existing products to be altered simply by creating a new combination of building blocks or altering existing combinations, respectively.

The process creation module receives an order communicated by, for example, an order generation system, and creates a process for provisioning the order. The process created is defined by a task list that identifies the particular tasks stored in the database that are needed to provision the order. The process creation module communicates this task list to the process management module. The process management module identifies the tasks identified in the task list that are to be provisioned manually (the "manual tasks"), and the tasks that are to be provisioned automatically (the "automatic tasks"). The process management module further determines an appropriate sequence for completing the tasks, and communicates the manual tasks to the manual task processing system and the automatic tasks to the automatic order processing system according to the sequence.

The process creation module generally includes an order decomposition module and a task list management module. In general, the order decomposition module receives, validates, versions and prepares an order for future processing. More specifically, the order decomposition module decomposes the order into its components (building blocks) and creates a list of the building block needed to provision the order (a "building block list"). The order decomposition module may include an order validation module that identifies the order type, such as new orders, requests to cancel and requests to supplement an order, and whether the order can be provisioned. The order decomposition module uses reference data from the reference data database to map the order to the appropriate building blocks and determine the validation rules.

In general, the task list management module creates task lists, queues supplements, updates the order status and manages cancels. To create a task list, the task list management module generally identifies the appropriate group of tasks associated with each of the building blocks indicated in the building block list, and creates a task list identifying these tasks.

The process management module receives the task list from the task list management module and generally includes a task sequencing module and a task management module. The task sequencing module generally receives the task list from the process creation module and manages the task list ensuring that each task is completed in the appropriate sequence. The task management module manages the provisioning of tasks according to task-related information stored in the reference data database. The task management module sends tasks to an automatic order processing system for automatic provisioning, or a work list for manual provisioning.

The manual task processing system creates and maintains a work list that includes the manual tasks. These manual tasks are communicated to a person or organization for manual processing.

The foregoing summary has been provided only by way of introduction. Nothing in this section should be taken as a limitation on the following claims, which define the scope of the invention.

BRIEF DESCRIPTION OF SEVERAL VIEWS OF THE DRAWINGS

The invention can be better understood with reference to the following drawings and description. The components in the figures are not necessarily to scale, emphasis instead being placed upon illustrating the principles of the invention. In the drawings.

DETAILED DESCRIPTION

In the text that follows, many of the examples are presented in terms of managing orders for telecommunication products. Managing orders for telecommunication products is used for demonstrative purposes only. The systems and any part of the systems described in this document may, in fact, be implemented to manage orders for any products. Further, the term "product" is used in this document to denote goods, services or any combination of goods and services.

Figure 1:
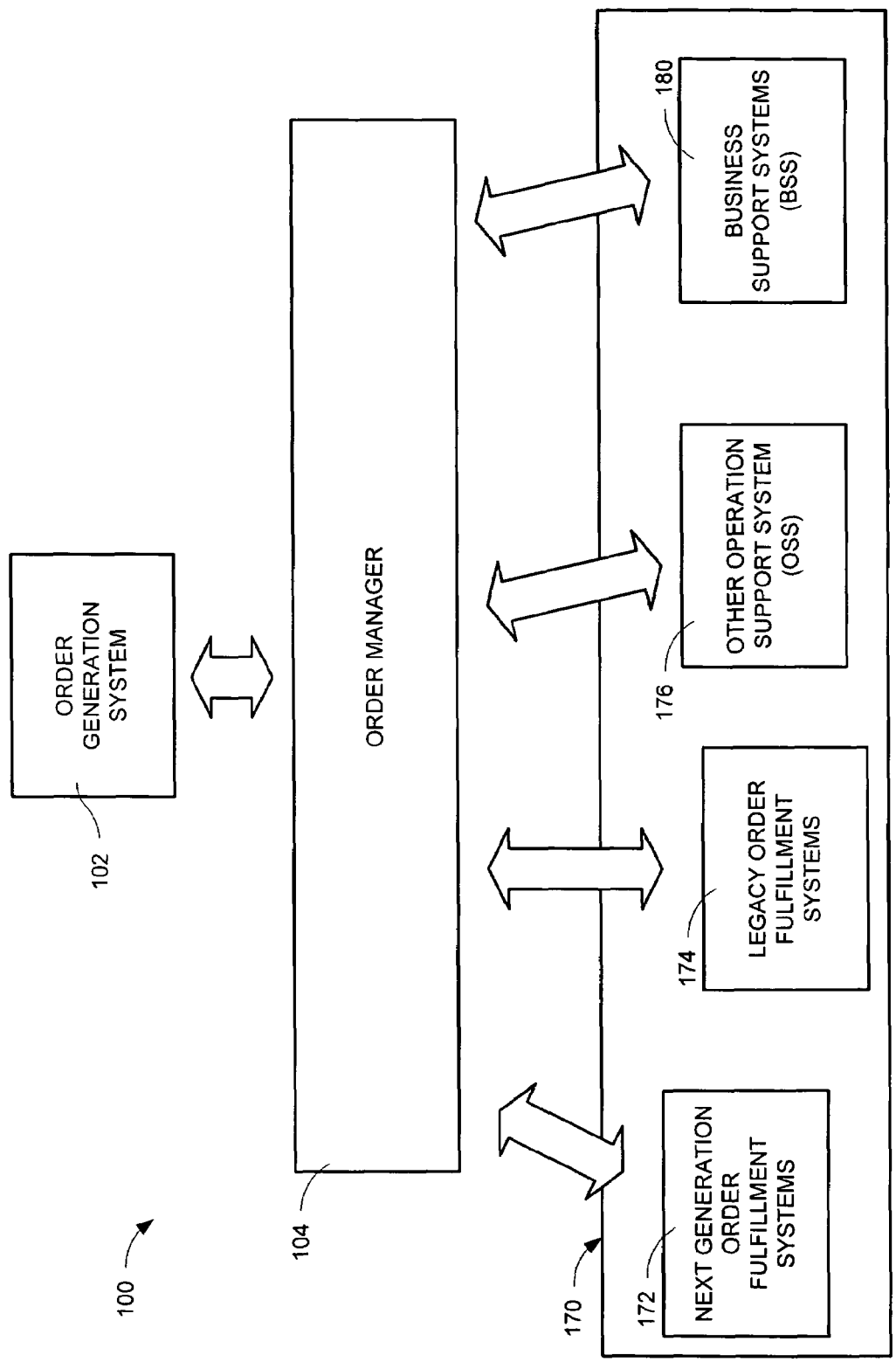
FIG. 1 is a block diagram of an order management system.

One example of a system for managing an order (an "order management system") is shown in FIG. 1. The order management system provides a foundation for the process automation and the human workflow that are required to provision an order. As used in this document "order" refers to a request for products, including goods, services or a combination of goods and services. In addition, "provision" refers to the activities involved in and related to providing products to the entity that placed the order. In contrast with traditional process management applications in which a process is selected from among a group of pre-defined processes for provisioning an order, the order management system of FIG. 1 dynamically creates a process for provisioning an order from pre-defined tasks specifically for that order when that order is received. The order management system 100 generally includes an order generation system 102, an order manager 104, and an automatic order processing system 170.

The order generation system 102 may include one or more systems for receiving an order. These systems allow manual and/or automatic entry of an order. The order generation system 102 may include a web site, an order entry system, a third-party order entry system, and combinations of the foregoing. The order generation system 102 may include an enterprise resource planning ("ERP") system such as: Oracle, SAP, Siebel and ICOMS.

The order manager 104 provides a link among the order generation system 102, and the automatic order processing systems 170, some or all of which may include disparate systems. In addition to integrating the other components of the order management system 100, the order manager 104 effectively and efficiently manages order provisioning. In general, the order manager 104 dynamically creates processes from pre-defined tasks in response to orders received from the order generation system 102. The order manager 104 may manage these processes, or some of the tasks included in the processes, for manual provisioning or communication to the automatic order processing system 170 for automatic provisioning.

The automatic order processing system 170 may include business support systems ("BSS") 180, operation support systems ("OSS"), or combinations of the foregoing. For example, the automatic order processing system 170 may include a next generation order fulfillment system 172, a legacy order fulfillment system 174, and other OSS. The BSS 180 may provide additional functionality that supports order management, such as billing and inventory tracking, and may use the information created by the other components of the order management system 100. The automatic order processing system 170 performs the tasks communicated by the order manager 104 and communicates messages to the order manager 104 indicating, for example, when a task is completed or that an error has occurred.

Figure 2:
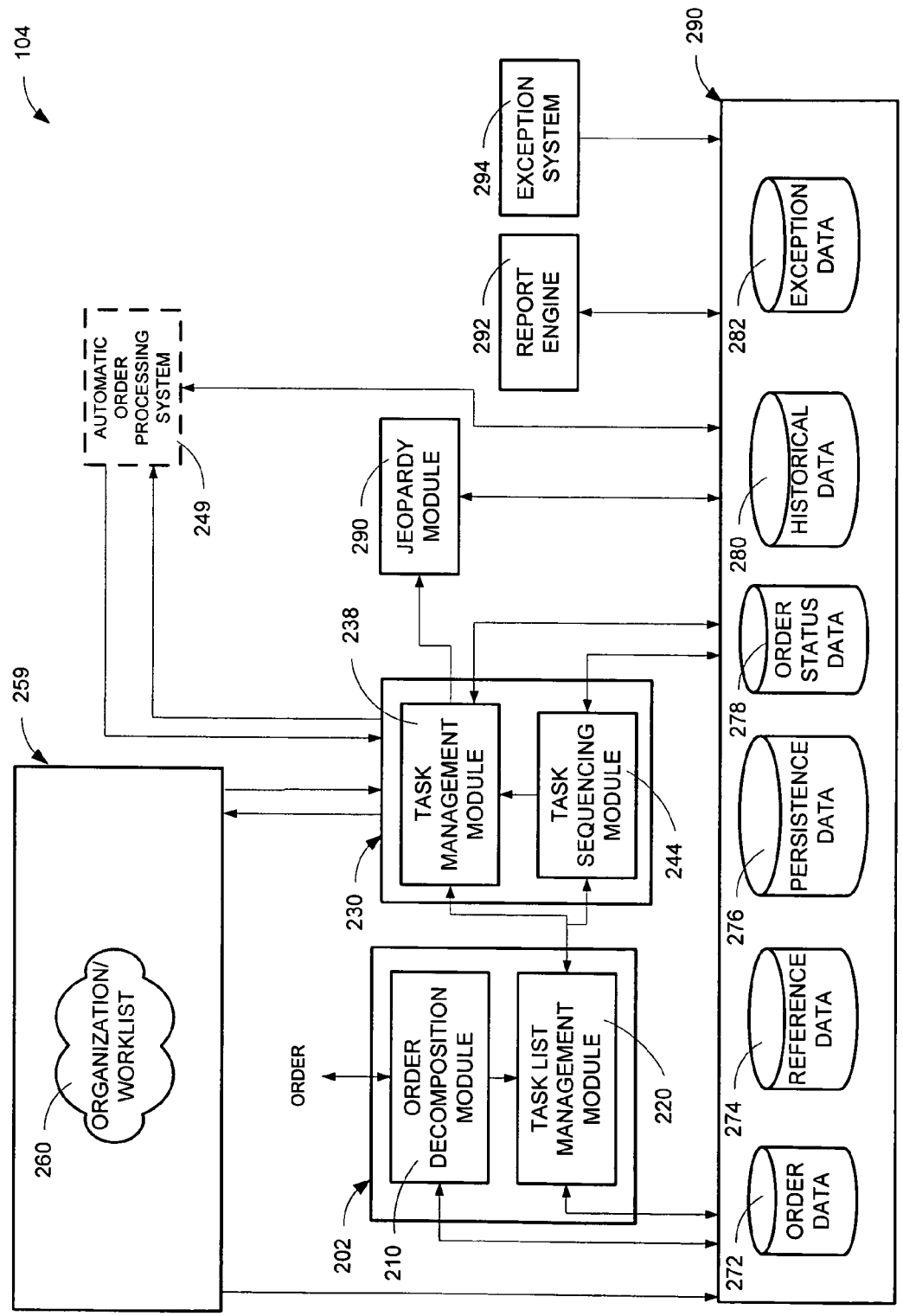
FIG. 2 is block diagram of an order manager showing the relationship between the order manager and other components of an order management system.

An example of an order manager 104 is shown in FIG. 2. The order manager 104 generally includes a process creation module 202, a process management module 230, a database 290, and a manual task processing system 259. The order manager 104 may also include a jeopardy module 290, a report engine 292, an exception system 294, or any combination of the foregoing. The process creation module 202, process management module 230, jeopardy module 290, report engine 292 and exception system 294 (as well as the order generation system, and automatic order processing system (102, and 170, respectively, in FIG. 1) may be implemented in computer-readable software code that is executed by one or more processors. The process creation module 202, process management module 230, jeopardy module 290, report engine 292 and exception system 294 may be implemented as a single module or in independent modules. The processor or processors include any device, system, or the like capable of executing computer-executable software code. The code may be stored on a processor, a memory device or on any other computer-readable storage medium. Alternatively, the software code may be encoded in a computer-readable electromagnetic signal, including electronic, electrical and optical signals. The code may be source code, object code or any other code performing or controlling the functionality described in this document. The computer-readable storage medium may be a magnetic storage disk such as a floppy disk, an optical disk such as a CD-ROM, semiconductor memory or any other physical object capable of storing program code or associated data.

The order manager 104 may communicate some or all of the tasks to the automatic order processing system (170 in FIG. 1) directly in a format that is compatible with that used by the automatic order processing system 170. The order manager 104 may be designed as a stand-alone application. Alternately, the order manager 104 may be built on top of an enterprise application integration ("EAI") layer, such as that provided by Vitria Businessware or Tibco's Active. In this case, the state and session management, as well as guaranteed delivery of communications is handled by the technology on which the order manager 104 is built.

The manual task processing system 260 creates and maintains a work list that includes the manual tasks. These manual tasks are communicated to a person or organization 260 for manual processing. When manual processing is complete the person or organization 260 communicates the completion of the manual task. Further, the person or organization 260 may communicate errors or other messages. The work list may include a web-based graphical user interface that displays tasks that need to be manually processed or for which an error has occurred. In contrast, the automated tasks are communicated out of the order manager 104 to an automated order processing system 249. The automated order processing system 249 communicates completed tasks or errors back to the order manager 104.

In the order manager 104, the process creation module 202, receives an order communicated by, for example, an order generation system, and creates a process for provisioning the order. The process includes a task list that identifies the particular tasks stored in the database 290 that are needed to provision the order. The process creation module 202 communicates this task list to the process management module 230. The process management module 230 identifies the tasks identified in the task list that are to be provisioned manually (the manual tasks), and the tasks that are to be provisioned automatically (the automatic tasks). The process management module 230 further determines an appropriate sequence for completing the tasks, and communicates the manual tasks to a manual task processing system 259 and the automatic tasks to an automatic order processing system 249 according to the sequence. The process management module 230 may also communicate information to one or more automatic processing systems 249.

As shown in FIG. 2, the database 290 may be functionally described in terms of many separate databases 272, 274, 276, 278, 280, and 282. However, the physical implementation of the database 290 may include any number of separate databases with the functional components arranged in any manner among the separate databases. In general, the database 290 stores information relating to orders and the processing of orders, including order history, order status, errors and exceptions. Further, the database 290 includes a data structure that supports the analysis and tracking of orders as they move through the order provisioning process by storing state and order data at various intervals for each order as the order is provisioned. The data stored by the database 290 may also be used to restore the order management system should the order manager 104 ever go down.

Figure 3:
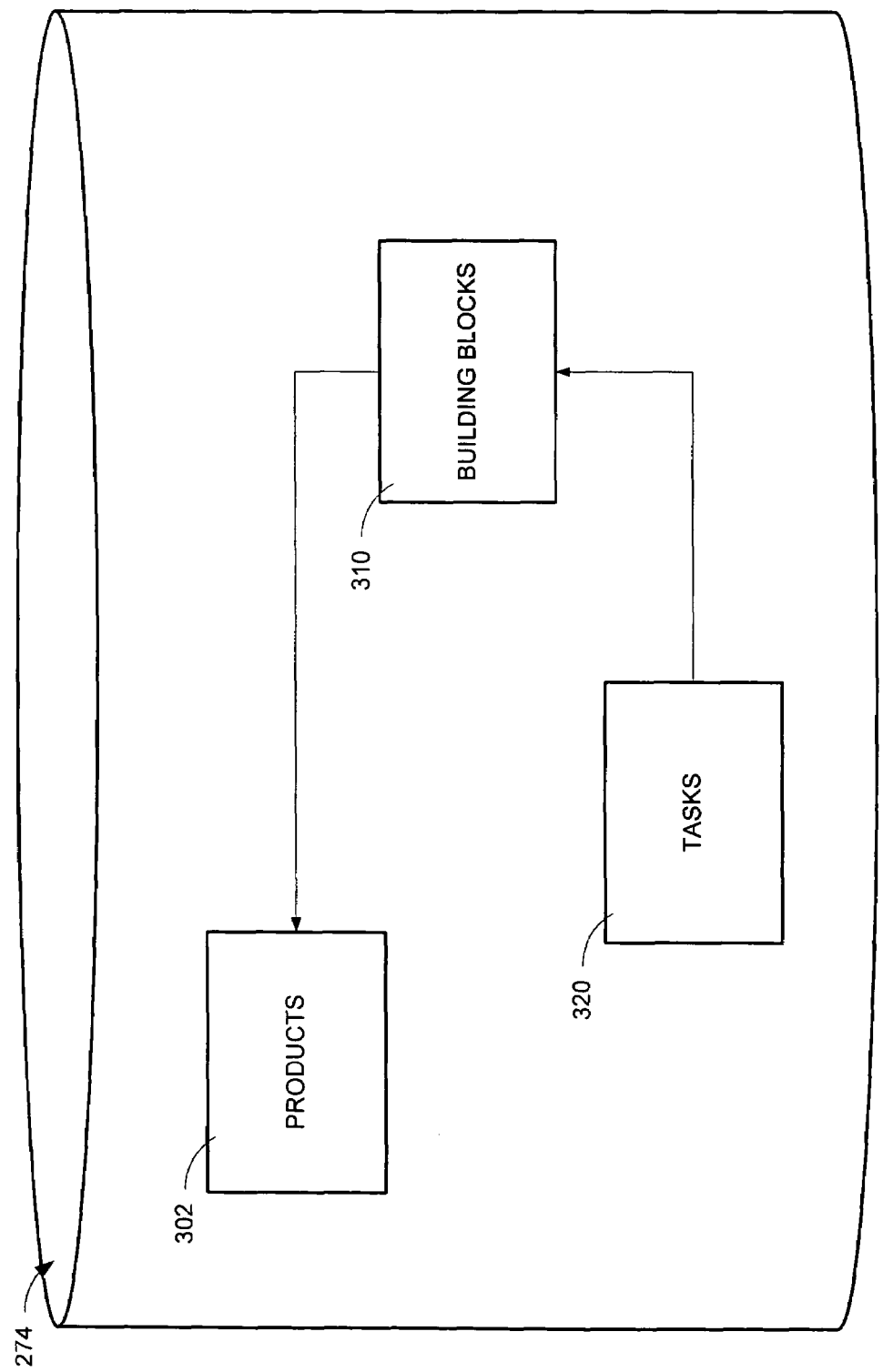
FIG. 3 is a block diagram of a reference data database.

The database 290 may include a reference data database 274. The reference data database 274 includes a data structure that enables the functionality of the order manager 104. As shown in FIG. 3, the reference data database 274 generally stores information relating to products 302, building blocks 310, and tasks 320, including the relationships among the products 302, building blocks 310, and tasks 320.

The building blocks 310 stored in the reference data database 274 may be used to define products 302. In addition, the building blocks 310 may be used to link the products included in an order to the tasks needed to provision those products. Therefore, a building block may be thought of as a component of a product and a link to the tasks required for provisioning that component. In addition, a building block may be thought of as a sub-process (or a pointer to one or more tasks) that may be combined with other sub-processes to create a process for provisioning a product.

Relationships may be created among building blocks. For example, building blocks may be nested so that one building block is dependent upon another. In some cases, a building block may depend on only one other building block (the "parent building block"), but may have more than one building block depend from it (the "child building blocks"). In any case, a building block from which no other building blocks depend (the "root building blocks"), is linked to the group of tasks required to provision that root building block.

Building blocks 310 may be used to build products 302. A single building block may be used to define a product or may be combined with other building blocks to define a product. The products 302 include the goods and services that are requested in an order, and may have varying levels of complexity. For example, a product 302 may include only a single good or service defined by a single building block. Alternatively, a product may include a group of goods and services (a "bundled product") defined by several building blocks, other products, or any combination of products and building blocks. The products included in a bundled product may have a hierarchical relationship in which some products (the "child products") depend on other products (the "parent products"), and the products from which no other products depend (the "root products") are each related to one or more of the building blocks 310. By using building blocks in this manner, new products may be added and existing products may be altered simply by creating new combinations of building blocks or altering existing combinations, respectively.

The tasks 320 stored in the reference data database 274 each include a process step or action. In general, a group of tasks is associated with each root building block and each group includes the one or more steps needed to provision the root building block with which it is associated. In some cases, however, a single root building block may require different groups of tasks to enable its provisioning under differing circumstances. For example, an order for the installation of a phone line may simply require a single action, such as establishing the phone service. However, under other circumstances, it may also require an additional step, such as disconnecting phone service at another location. Therefore, to account for the different circumstances that may surround an order for a product, the reference data database 274 may include a group of tasks for each of a set of pre-defined actions associated with a root building block.

For example, an order management system for provisioning telecommunication products (including goods and services) may include a group of tasks for performing a "move action," an "add action," a "change action" and a "delete action" for each root building block. The group of tasks for performing an add action includes those tasks needed to add the associated product component (building block). Likewise, the group of tasks for performing a delete action includes those tasks needed to discontinue or remove the associated product component (building block). Similarly, the group of tasks for performing a move action includes those tasks required to remove an existing product, such as a service, from one location and reestablish the product in another location. The group of tasks for performing a change action includes those tasks required to change an existing product.

Figure 4:
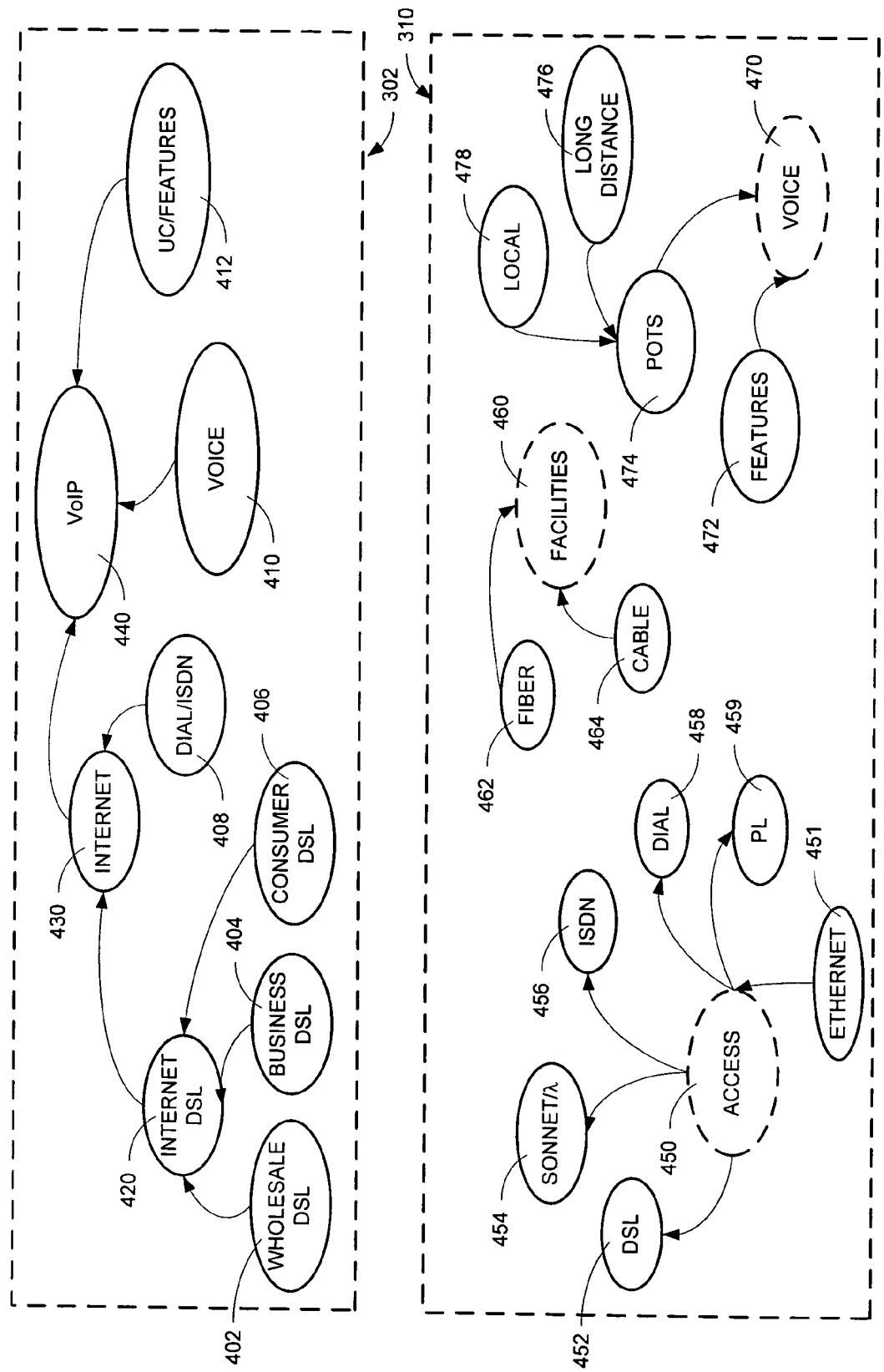
FIG. 4 is a block diagram of products and building blocks.

An example set of products and building blocks is shown in FIG. 4. In this example, the products 302 are telecommunication products and the building blocks 310 correspond to various components or features of telecommunication products. The building blocks 310 are hierarchically related. The voice building block 470 includes building blocks related to providing voice telephony services, POTS ("plain old telephone service") 474, and features 472. The POTS 474 building block includes the local 478 and long distance 476 root building blocks, which are linked to the tasks needed to establish local POTS and long distance POTS, respectively. The features building block 472 is a root building block linked to the tasks needed to implement a feature such as three-way calling or caller ID. The facilities building block 460 includes the building blocks related to providing the physical transmission lines that transmit telecommunication signals. The facilities building block 460 includes the fiber 462 and cable 464 root building blocks, which are linked to the tasks needed to install fiber optic cable and coaxial cable, respectively. The access building block 450 includes the building blocks related to the method by which telecommunication services may be accessed. The access building block 450 includes DSL 452, Sonnet/A 454, ISDN 456, dial 458, and PL ("phone line") 459 root building blocks. Each of these root building blocks are linked to the tasks needed to effect their implementation.

The building blocks 310 are used to create the products 310, which include both bundled and root products. The wholesale DSL 402, business DSL 404, consumer DSL 406, dial/ISDN 408, voice 410 and UC/features 412 products are all root products because no other products depend from them. These root products are all linked to one or more of the building blocks 310. For example, the voice 410 product may be linked to the voice building block 470. When an order for a voice line is received, the voice 410 product will be linked to one of the root building blocks associated with the voice building block 470 depending on the particular type of voice line indicated in the order. In contrast, the internet DSL 420, internet 430 and ("voice-over-internet-protocol") VoIP 440 products are all bundled products. These products include their child products, the children of the child products and so on. Therefore, the bundled products are linked to all the building blocks to which their root products are linked. For example, the internet 430 product is linked to the building blocks to which the internet DSL 420 and dial/ISDN 408 building blocks are linked. Similarly, the internet DSL 420 product is linked to all the building blocks that the wholesale DSL 402, business DSL 404, and consumer DSL 406 are linked.

Figure 5:
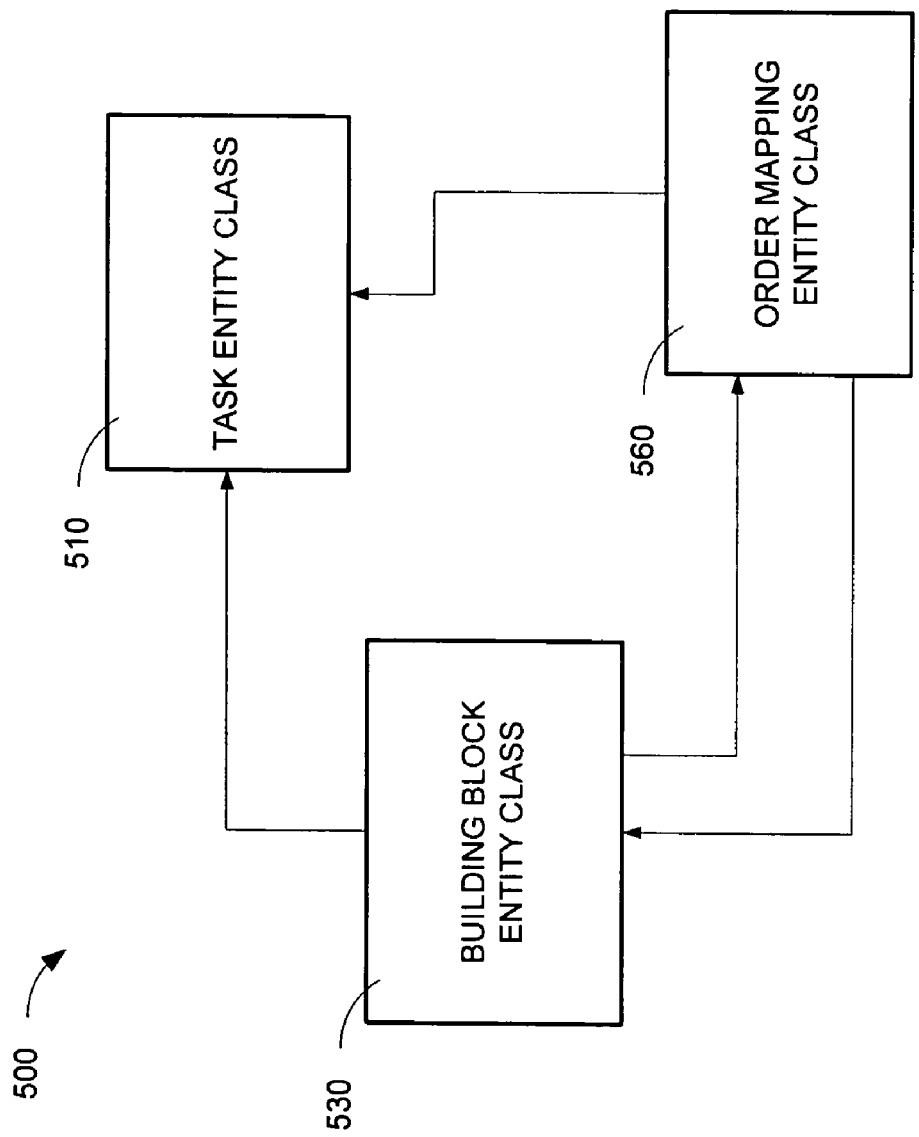
FIG. 5 is a block diagram of reference data data structure.

The reference data database includes a data structure, an example of which is shown in FIG. 5. This data structure enables much of the functioning of the order manager (see FIG. 2), and generally includes a task entity class 510, a building block entity class 530, and an order mapping entity class 560.

Figure 6:
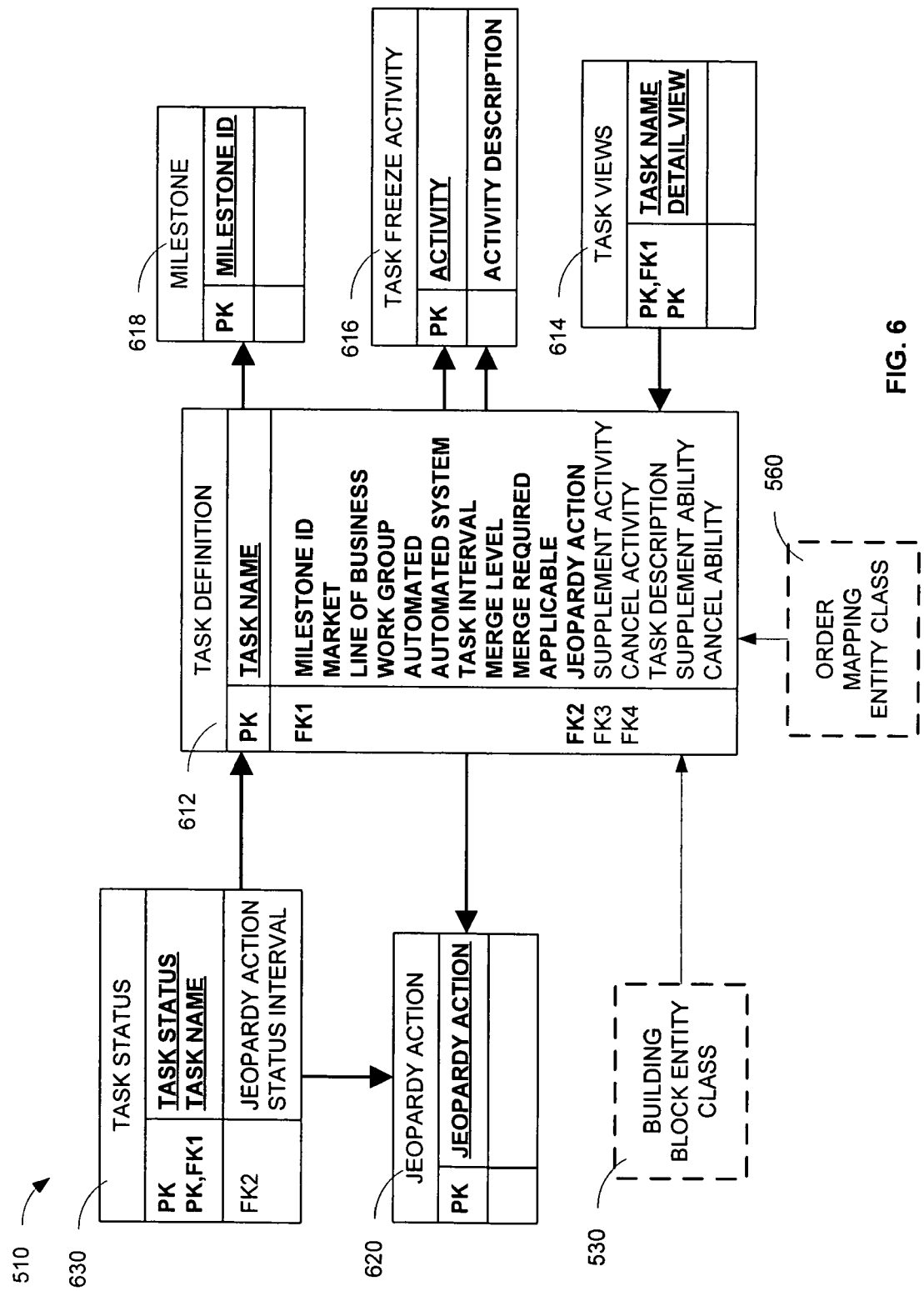
FIG. 6 is an entity-relationship diagram of a task entity class.

An entity-relationship diagram of an example of a task entity class 510 is shown in FIG. 6. In general, the task entity class 510 stores and links information that relates to provisioning the order. This includes status, logging and activity ("SLA") information, and information relating to an automatic order processing system and/or a work list. The task entity class 510 may include the following entities: task definition entity 612, a task status entity 630, a jeopardy action entity 620, a milestone entity 618, a task freeze activity entity 616, and a task views entity 614. Other entities may alternatively or additionally be included.

The task entity class 510 generally includes a task definition entity 612 that stores data relating to each task ("task data objects"). The building block 530 and order mapping 560 entity classes may be linked to the task entity class 510. In the example shown in FIG. 6, the task entity 612 is designed store tasks according to market and line of business. The task definition entity 612 includes a task name field, which serves as the primary key for the entity, thus uniquely defining each task data object. In addition, the task definition entity 612 may include the following fields as foreign keys: milestone ID, jeopardy action, supplement activity, and cancel activity. The milestone ID field references a milestone ID data object in the milestone entity 618, which identifies a task for which its completion indicates that the order has reached a particular milestone. Once the order has reached the milestone (the identified task has been completed), the order may not be supplemented or cancelled. The supplement activity field defines an activity to be performed by the order manager in response to a request to change an order (a supplement order). Similarly, the cancel activity field defines an activity to be performed by the order manager in response to a request to cancel an order (a cancel order). The jeopardy action field is linked to the field in the jeopardy action entity 620 with the same name. The jeopardy action field stores an activity to be performed when the time to perform a task has expired. This allows timers to be set that define and track time intervals relating to specific tasks. This in turn allows tracking and notification when the time intervals elapse. The task definition entity 612 may also include a task interval field, which stores a data object defining the time for performing the task. This time interval may be indicated in days or any other measure of time.

Additional fields may also be included in the task definition entity 612. For example, as shown in FIG. 6, the task definition entity 612 may include a task description field (for storing a description of the task), a market field (for storing a geographic area, such as a city that is associated with the task), a line of business field (for storing an organization within a company, such as consumer, small business, wholesale or network, to which the task is related). In addition, the task definition entity 612 may include a field for storing a specific queue to which the task should be sent, if the task is a manual task, or if the task is an automatic task for which an error has occurred (the "work group" field). The supplement ability and cancel ability field include data objects that indicate whether the task can accept a supplement order or a cancel order, respectively, or if the task requires an activity prior to supplementing or canceling, respectively (a freeze order). The automated field stores a data object indicating whether a task is automated or not (manual). For example, a "yes" data object in this field may be used to indicate that the task is automatic, while a "no" flag may be used indicate that the task is manual. For automated tasks, the automated system field specifies the particular automatic order processing system, to which the task should be sent for completion.

The task definition entity 612 may also include fields that define whether a task may be merged with another task. Merging tasks generally includes combining identical tasks that are included in the task list more than once. The merge required field stores a data object indicating whether the task is required to be merged, if a merge is possible. A merge is generally possible for tasks that are to occur in parallel. For tasks that may be merged, the merge level field stores a data object indicating the level at which the tasks may be combined. For example, tasks may be merged at the order, site or other defined level. In addition, this field may include a data object indicating that no merge is permitted. Additional fields may be added to the task entity 612 to include additional information.

The task entity class 510 may also include a task status entity 630. The task status entity 630 may define the duration a task may remain in a particular status. If this duration is exceeded, a jeopardy process may be invoked. The task status entity 630 includes the task name and task status fields as part of the primary key, which uniquely defines a task status entity data object. The task name field may also be part of the foreign key and is linked to the task definition entity 612. The task status field stores a data object indicating the status for which a timer should be set. The status interval field stores a data object indicating the duration for which the task can remain in a status. The jeopardy action field is part of the foreign key and is linked to the jeopardy action entity 620, and stores a data object indicating the activity to be performed if the duration indicated in the status interval field is exceed.

The task entity class 510 may also include a jeopardy action entity 620. The jeopardy action entity 620 stores information relating to activities that are to be performed if the duration, indicated in the status interval field of the tasks status entity 630, is exceeded. The jeopardy action entity 620 may be expanded as additional jeopardy requirement are build into the order manager. The jeopardy action entity 620 may include a jeopardy action field as part of the primary key, which uniquely defines each instance of the jeopardy action entity 620 (each a "jeopardy action data object"). This entity may also include other fields for storing additional information.

The task entity class 510 may also include a task views entity 614. The task views entity 614 stores views or style sheets for displaying task-related information in a work list. The views or style sheets may display any data that is relevant to a task. The task views entity 614 generally displays a relationship at the task level. However, the display may be modified to include other parameters such as source, if required. The task views entity 614 includes a task name field and a detail view field as part of the primary key, which uniquely defines a task views data object. In addition, the task name field may be part of the foreign key, which provides a link to the task definition entity 612.

The task entity class 510 may also include a milestone entity 618. The milestone entity 618 stores the milestones for a task. If there is more than one milestone for a task, an additional table may be required to manage the milestones in a many-to-many relationship. Additional milestones can be added, and the order decomposition module may be modified to handle the additional milestones. The milestone entity 618 generally includes a milestone ID as part of the primary key that uniquely identifies each instance of the milestone entity 618 (each a "milestone data object").

The task entity class 510 may also include a task freeze activity entity 616. The task freeze entity 616 stores information relating to activities that are to be performed to freeze tasks ("freeze activities"). These activities may be designed into a task management module. The freeze activities should provide referential integrity to the supplement activity and cancel activity fields in the task definition table 612. The task freeze activity entity 616 generally includes an activity field as part of the primary key that uniquely identifies each instance of the task freeze activity entity 616 (each a "task freeze activity data object"). The task freeze activity entity 616 may also include an activity description field that provides a detailed description of the freeze activity. The task entity class 510 may alternatively or additionally include other entities.

Figure 7:
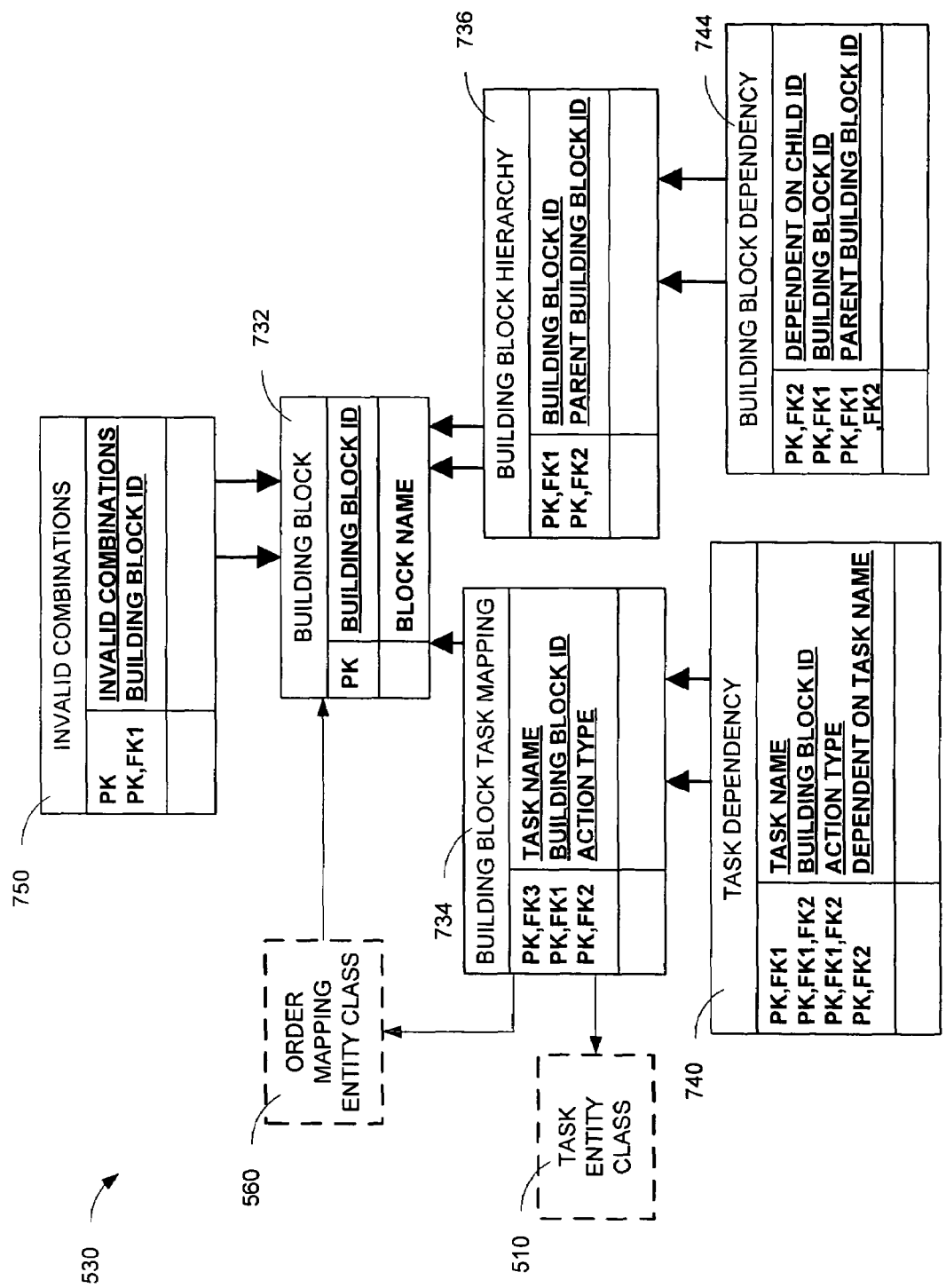
FIG. 7 is an entity-relationship diagram of a building block entity class.

An entity-relationship diagram of an example of the building block entity class 530 is shown in FIG. 7. The building blocks entity class 530 allows products and dynamic task lists to be created, building blocks to include child tasks and/or child building blocks, and dependencies to be maintained between building blocks and tasks. In addition, the building block entity class maps tasks to building blocks according to an action, such as move, add, change, or delete. Further, this entity class allows additional tasks to be created for a particular order type via the addition of additional building blocks.

The building block entity class 530 may include a building block entity 732, which stores information relating to product components. More specifically, the building block entity 732 contains fields for storing building blocks, including parent and child building blocks. Each field that stores a building block may be identified by a block name. The building block entity generally includes a building block ID as part of the primary key, which uniquely identifies each instance of the building block (each a "building block data object"). The building block ID may include an auto generated surrogate key, a key assigned by a configuration application, or a logical key such as block name.

The building block entity class 530 may include a building block hierarchy entity 736. The building block hierarchy entity 736 may be used to create relationships among building blocks. In general, some building blocks represent product components. These product components may be mapped to other building blocks to define products. The building block hierarchy 736 allows the building blocks representing components (the child building blocks) to be mapped to other building blocks (the parent building blocks) to define products or bundled products. There is no limit on the number of children a building block may have. In some cases, a building block may be mapped to child building blocks or tasks, but not both. In these cases, if a building block needs to be mapped to both building blocks and tasks, the building block hierarchy entity may be merged with the building block tasks mapping entity 734 to maintain the dependencies across both the building blocks and the tasks. The building block hierarchy entity 736 generally includes a building block ID and a parent building block ID fields as part of the primary key. The building block ID and parent building block ID fields may also be part of the foreign key. The building block ID and parent building block ID fields link the building block hierarchy entity 736 to the building block entity 732, to identify a child and parent building block, respectively.

The building block entity class 530 may include a building block dependency entity 744. The building block dependency entity 744 creates a relationship between two child building blocks. This relationship may be hierarchical in nature. The building block dependency entity 744 may include a field for each dependency, and resolves the many-to-many relationship between the building block hierarchy entity 736 and itself. The building block dependency entity 744 may include a building block field as part of the primary foreign key. The building block field may also be part of the foreign key, which provides a link to the child building block. The building block dependency entity 744 may also include a dependent on child ID as part of the primary key. The dependent on child ID may also be part of the foreign key, which provides a link to the building block upon which the child building block depends n. The building block dependency entity 744 may further include a parent building block ID as part of the primary key. The parent building block ID may also be part of the foreign key, which provides a link to the parent of both child building blocks. This field may be part of both composite foreign keys.

The building block entity class 530 may further include an invalid combinations entity 750. The invalid combinations entity 750 defines building block combinations that are not permitted. This entity resolves a many-to-many relationship between the building block entity 732 and itself. If more than two building blocks make up an invalid combination, additional columns may be added. The invalid combinations entity 750 may include an invalid combinations field as part of the primary key, which uniquely identifies each instance of the invalid combinations entity 750 (each an "invalid combinations data object"). The invalid combinations entity 750 may also include a building block ID field as part of the primary and key. The building block ID field may also be part of the foreign key, providing a link to the building block entity 732. The building block ID and invalid combinations fields each identify a building block in the building block entity 732 that forms part of an invalid combination.

The building block entity class 530 may further include a building block task mapping entity 734. The building block task mapping entity 734 maps the root building blocks to the tasks required to provision them. The building block task mapping entity 734 generally includes a task name field and a building block ID field as part of the primary key. These fields may also be part of the foreign key, which references a building block and the task to which it is mapped. The task name field links the building block task mapping entity 734 to the task entity class 510 and the building block ID field links the building block task mapping entity 734 to the building block entity 732. In addition, an action type ID field may be included as part of the primary and foreign keys. The action type ID may include an action code links a building block to a different set of tasks according to the action associated with the building block. This allows for each action related to a building block to have a different set of provisioning tasks.

The building block entity class 530 may further include a task dependency entity 740. The task dependency entity 740 manages dependencies between tasks and may include a task name field, a building block ID field, and a dependent on task name as part of the primary and foreign keys. The task name field identifies a particular task (a "task data object"), while the building block ID field identifies the building blocks the task data object provisions, and the action type identifies the action type for which the task provisions the identified building blocks. The dependent on task name field identifies a task that must be completed prior to starting the task identified by the task name field. The building block entity class 530 may alternatively or additionally include other entities.

Figure 8:
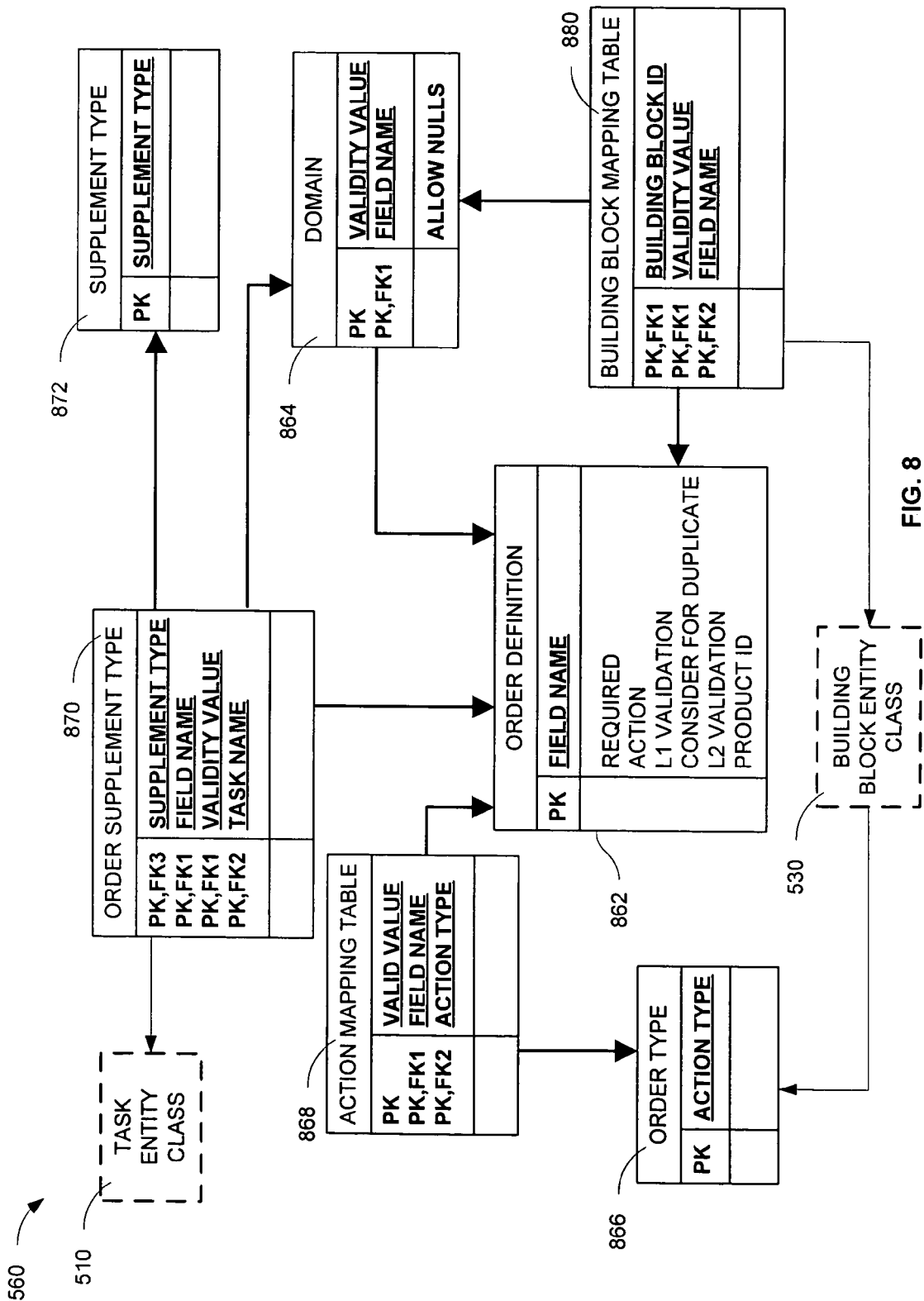
FIG. 8 is an entity-relationship diagram of an order mapping entity class.

An entity-relationship diagram of an example of the order mapping entity class 560 is shown in FIG. 8. The order mapping entity class 560 provides the ability to map an order to components recognized by the order manager. More specifically, the order mapping entity class 560 may be used to map the products, parameters and actions contained in an order to the building blocks, actions and tasks of the order manager. In addition, the order mapping entity class 560 allows the changes indicated in a supplement order to be mapped to a supplement type, which aids in determining whether a completed or in-progress task is affected by a new version of an order. The mapping may be implemented through the use of foreign keys and/or mapping rules.

For example, the order mapping entity class 560 may include rules for defining the relationships among the products and actions included in an order, and the building blocks and actions in the database required to provision the order. The mapping information supplements other data regarding the order and does not replace such data data. In addition, the mapping should leverage and preserve the hierarchy of the order. In other words, for an order that includes, for example, installing a telephone line at a home and removing an Internet connection from a business, the mapping should ensure that the action (installing), product (telephone line) and site (home) remain associated with each other, and the action (removing), product (Internet connection), and site (business) remain associated with each other.

The order mapping entity class 560 may include an order definition entity 862 and generally stores information relating to a particular field in an order (an "order field"). This entity allows validation rules to be defined for each order field. The order definition entity 862 generally includes a field name field as part of the primary key, which uniquely identifies each instance of an order field (each an "order field data object"). However, for any given order field, there may be an order field data object for each action and/or product that may be associated with that order field. The order definition entity 862 may also include a required field that includes a data object, such as "yes" or "no," which indicates whether validation is required for the order field. The order definition entity 862 may also include an action field that designates the validation mapping for a particular action. The action field may be part of the primary key (not shown). In a similar manner, the order definition entity 862 may include a product ID field that designates validation for a particular product or building block. The product ID field may also be part of the primary key. The order definition entity 862 may include an L1 validation field and an L2 validation field. Each of these fields may include a data object, such as "yes" or "no," which indicates whether the field is to be part of the initial (level 1) and further (level 2) validations, respectively. Similarly, the order definition entity 862 may include a consider for duplicate field that may include a data object, such as "yes" or "no," which indicates whether the field should be considered when determining if an order is a duplicate of another order or version.

The order mapping entity class 560 may include an order type entity 866, which maintains a list of valid actions. The order type entity 866 generally includes an action type field as part of the primary key, which uniquely defines an action. The action types may include data objects such as, "move," "add," "change," and "delete." The building block entity class 530 may be linked to the order type entity 866.

The order mapping entity class 560 may include an action mapping entity 868 and generally maps a field to an order type or action type. This allows a particular field to be used to determine the action to take on an order. It is likely that both the action derived from this table will need to be saved during the mapping and used to select the correct tasks for the building block. The action mapping entity 868 generally includes a field name as part of the primary and foreign keys. The field name field provides a link to the order definition entity 862 and identifies the field to be used in determining an action to be taken. The action mapping entity 868 may also include a valid value field as part of the primary key. The valid value field is the value of the field in the field name that specifies the action. The action mapping entity 868 may also include an action type field as part of the primary and foreign keys. The action type field provides a link to the order type entity 866 and references a data object indicating an action being mapped from an order.

The order mapping entity class 560 may include a domain entity 868, which allows for greater definition of a field that is to be used for validation. Valid values, ranges, and data types can be included in this entity. Based on the degree of validation required this entity may include alternate and/or additional fields. In some cases, the fields on this entity may alternatively be included in the order definition entity 862. The domain entity 868 may include a field name field as part of the primary and foreign keys. The field name field provides a link to the order definition entity 862 and identifies a particular field. The domain entity 868 may also include a valid value field as part of the primary key. The valid value field indicates a valid value for the particular field. The valid value field may contain a data object, such as a null, indicating that there is no valid value for the field. However, in this case, there may be a range for the field.

The order mapping entity class 560 may include a building block mapping table entity 868, which is used to map the fields on an order to one or more building blocks. This mapping may map only one field value to one building block. However, depending on the format of the order, it may be necessary to map additional fields to the building block. Parameters may also need to be associated with building blocks. The building block mapping table entity 880 may include a field name field as part of the primary and foreign keys. The field name field provides a link to the order definition entity 862 and indicates a particular field in an order. The action type is not generally part of the foreign key because building blocks are the same regardless of action type. The building block mapping table entity 880 may further include a building block ID field as part of the primary and foreign keys. The building block ID provides a link to the building block entity class 530 and indicates the building block to which the field is mapped. Further, the building block mapping table entity 880 may include a valid value field as part of the primary key. The valid value field may also be part of the foreign key providing a link to the domain entity 864. Alternatively, the valid value field may include a data object that identifies a value in the field that designates a particular building block.

As a part of the mapping building blocks may need to be maintained at the product/site level, as well as the product of which a building block is part, so the correct action can occur. For example, if two telephone lines are requested in an order and one has an "add" action associated with it, and the other has a "disconnect" action associated with it, the correct actions must remain associated with the correct telephone numbers and the associated building blocks.

The order mapping entity class 560 may include a supplement type entity 872, which maintains a list of valid supplement types. The supplement type entity 872 includes a supplement type field as part of the primary key that uniquely defines each instance of a supplement type.

The order mapping entity class 560 may include an order supplement type entity 870, which maps changes on an order to a supplement type and to the tasks for which a supplement action is needed because of the change. If the supplement type entity 870 includes a mapping for a task, the change requires the task to be redone. This entity can be enhanced to store alternate functions that may be performed on a task instead of re-executing the task. The order supplement type entity 870 generally includes a supplement type field as part of the primary key that uniquely identifies an instance of the order supplement type entity. The order supplement type entity 870 may also include a field name as part of the primary key and a foreign key. The field name provides a link to the order definition entity 862 and indicates the field on the order (the order field) that has been changed. The order supplement type entity 870 may also include a task name as part of the primary and foreign keys. The task name provides a link to the task entity class 510 and indicates the task affected by the change to the order field. The order supplement type entity 870 may also include a valid value field as part of the primary and foreign keys. The valid value field provides a link to the domain entity 864 and indicates the value to which the order field was changed. The order mapping entity class 560 may alternatively or additionally include other entities.

Returning to FIG. 2, the database 290 may include an order data database 272. The order data database 272 stores information relating to an order as it is received from, for example, an order generation system, and includes mappings to information in other databases, such as building blocks, action codes and parameters. For example, the order data database 272 stores a version for each order and the related mapping. The version of an order is first persisted by the order decomposition module 210. The version may be updated by either the work list 260 or components of an EAI. Each version of the order may contain the current view of the complete order. Views may be created on top of the original order and may be displayed in the work list 260. This allows the order details to be displayed based on the task used. In addition, the order data database may include data created or updated in an automatic order processing system 249. This allows EAI components to query this database for data that is to be sent to the automatic processing systems 249.

All the data in the order data database 272 may be deleted when the provisioning of an order has ended. The task list management module 220 may initiate this deletion. If, however, the data in the order data database 272 is to be saved when provisioning of the order has ended, a task may be accessed and performed at the end of the provisioning process that sends the order data to long-term storage. Alternatively, the data may be archived as part of a status archiving process. Although, it is possible to use a remote order database, a database may still be needed to store order manager 104 mappings.

The database 290 may include an order status data database 278. The order status data database 278 stores the status of orders at various stages of processing by the order manager 104 and may be used to track orders as they are provisioned. In addition, the order status data database 278 may be used for reporting. Further, the order status data database 278 may be used to drive the processes of the order manager 104, as it contains all status information. Details of orders need not be stored in the order status data database 278, because a mapping can be made between this database and the order data database 272. The mappings between the order status data base 278 and the order data database 272 allow reports to be created based on order and status data by, for example, the report engine 292. The order status data database 278 may also store task lists and order changes, including order supplements and order cancels. Thus, the order status data database 278 allows predictive reports to be created by, for example, the report engine 292, and provides the information needed to create supplement and cancel task lists.

Status updates are made to the order status database 278 when messages are sent from the task management module 238 to the database 290. This is done via a publish—subscribe framework, which allows other modules or systems to listen for status updates. In general, data is updated in the order status database 278 via stored procedures. These stored procedures provide the ability to create the initial validation task list, update the order status, create the task list for provisioning an order, create a task list for a supplement order, modify flags, and archive an order.

Figure 9:
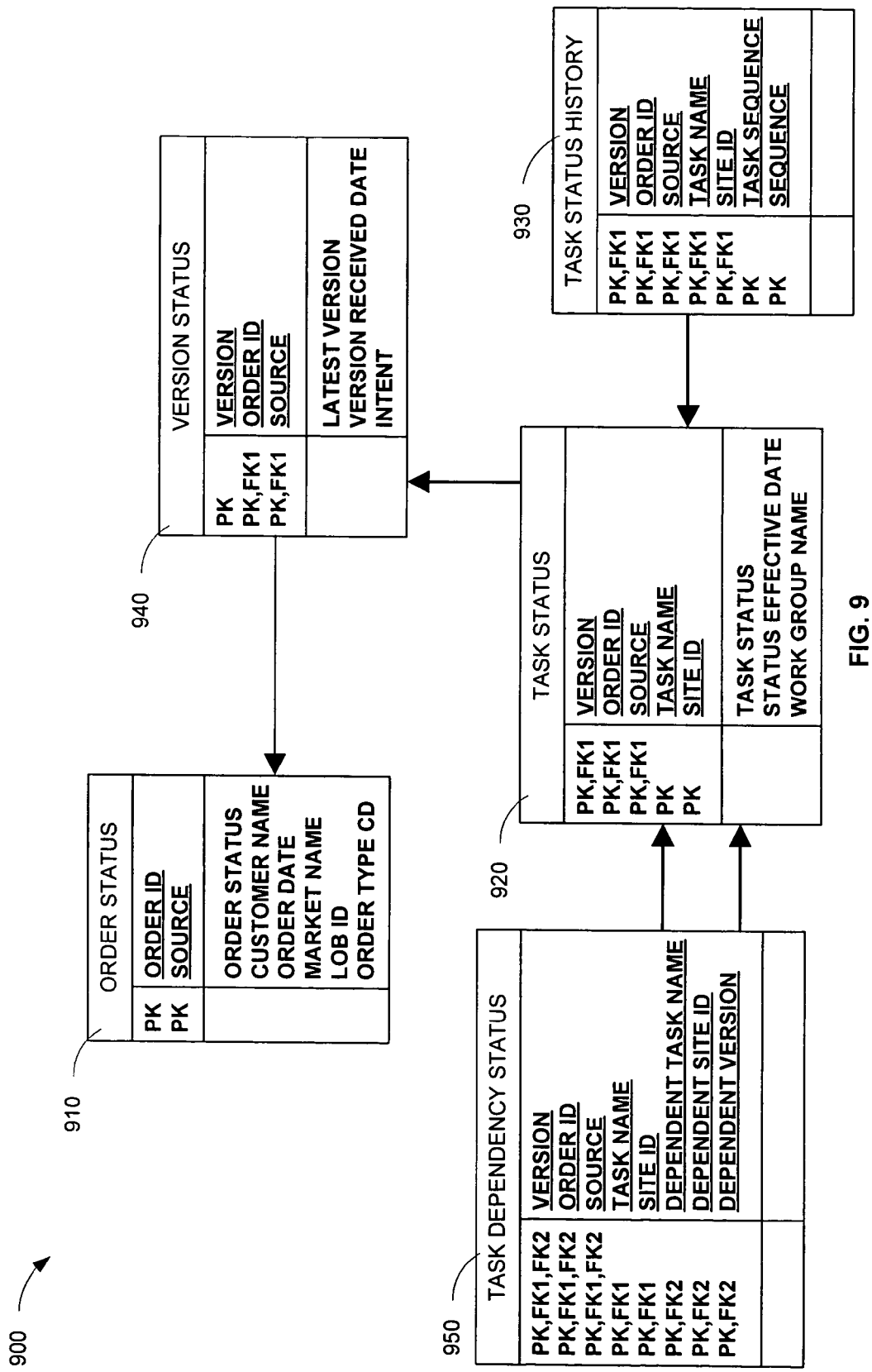
FIG. 9 is an entity-relationship diagram of an order status data entity class.

The order status data database 278 generally includes a data structure (an "order status data structure"). An entity-relationship diagram of an example of an order status data structure is shown in FIG. 9. The order status data structure 900 generally includes an order status entity 910, a version status entity 940, a task status entity 920, a task dependency status entity 950, and a task history status entity 930. Other entities, as well as combinations of the entities shown, may also be included.

The order status entity 910 may be used to track order level information. The order status entity 910 may include the following fields as part of the primary key, an order ID field, and a source field. The order ID field stores order ID data objects that uniquely identify a particular order. The source field stores source data objects that indicate the source of an order, such as an order entry system, channel, gateway, or, in a hosted environment, the company or organization that created the order.

In addition, the order status entity 910 may include additional fields that store information relating to the status of the order. For example, fields for order status, customer name, order date, market name, LOB ID ("line of business ID") and order type, may be included. The order status field stores order status data objects that indicate the current status of the order. The customer name field stores customer name data objects that indicate the name of the customer that placed the order. The market name field stores market name data objects that indicate the market name or city in which the order is to be provided. The LOB ID field stores LOB data objects indicating the line of business for which the order is to be provided. In some cases, the LOB may be organizations such as wholesale, consumer, and business. Alternatively, LOB may also be products such as video, telephony, and access, or may indicate whether an order is internal or external. The order type field stores order type data objects indicating the primary action associated with an order, such as "move," "add," "change," and "delete."

The version status entity 940 is generally used to define each version of an order. Cancel orders and supplement orders are treated as a version of the order they are canceling or supplementing, respectively. A field or row is inserted into the version status entity 940 for each non-duplicate version of an order. Each of these fields stores a version data object indicating a version of the order. This data object may be a number. Because duplicate orders are not included, there may be gaps in the sequencing of the version number. Fields are created in the version status entity 940 when a task list is created by the process creation module (see 202 FIG. 2). The version of the order that is currently being processed is identified by the latest version data object.

The version field serves as part of the primary key for the version status entity 940. The order ID and source fields may also serve as part of the primary key. These fields are generally also part of the foreign key that provides a link between the version status entity 940 and the order status entity 910.

The version status entity 940 may also include other fields. These fields may include a latest version field, a version recovery date field and an intent field, storing latest version, version received date, and intent data objects, respectfully. A latest version data object serves as a flag to indicate that a particular version is the currently processing version. Because it is possible for tasks relating to multiple order versions to be processing simultaneously, this information helps to avoid reprocessing tasks when such reprocessing is not required. A version received date data object indicates the date a version was received by the order manager. An intent data object indicates whether a particular version is intended as a supplement order or a cancel order. In addition, a field for storing a data object indicating the due date for the order may also be included. Such information may aid in forming queries involving the due date, and jeopardy reporting involving the due date.

The task status entity 920 provides a current view of a task. The most current status is displayed in the task status field. The task name and site ID fields are part of the primary key. In addition, the version, order ID, and source fields may also be part of the primary key, as well as part of the foreign key. The task status entity 920 copies SLA and certain field information from the reference data database (see FIG. 2). This entity may also include the following fields: task status, status effective date and work group name. The task status data field stores task data objects that indicate the most current status of a task. The default status may be "not ready to be worked." The status effective date field stores status effective date data objects that indicate the effective date and time of the current status. The effective date and time may include the date and time the current status took effect in the automatic order processing system or work list. The work group name data field includes work group name data objects that indicate the name of the workgroup that is to handle the task. The work group name data objects may be carried over from the reference data database.

The task status entity 920 may also include fields for the task start date, and the task complete date. A data object indicating the task start date is created when a non-default status is entered. A status data object indicating that a task is complete, such as a "complete" status, may trigger the entry of task complete date data object into the task complete date field. Other fields may also be included.

The task dependency status entity 950 provides the ability to map the current task to the task the current task depends upon. This mapping is created when the task list is published to the order status database prior to execution of the task list. In addition, the task dependency status entity 950 provides the ability to create predictive reports, and, in some cases, for driving the order manager. The task dependency status entity 950 includes the following fields as part of the primary and foreign keys: a source, order ID, version, task name, site ID, dependent task name, dependent site ID, and dependent version ID fields. Other fields and combinations are also possible.

The task status history entity 930 generally maintains a record of each status received for a particular task. All statuses may be stored in this entity. Rows are created in this entity only after a status is received for a task. However, there may be no entry for the "not ready to be worked" status.

Referring again to FIG. 2, the database 290 may include a persistence data database 276. The persistence data database 276 is typically managed by the order manager 104 or technology supporting the workflow. It stores the state and session information relating to the processing of the order manager 104 or order management system in case of system or other failure. Alternately, or additionally, the persistence data database 276 may be used to free up resources to allow other processes to run. The persistence data database 276 may also store all messages among the modules of the order manager 104, and among the order manager 104 and other applications, such as an automatic order processing system 249. This should provide guaranteed delivery and first-in-first-out ("FIFO") capabilities.

The database 290 may include a historical data database 280. The historical database is a warehousing or reporting view of provisioning-related data for completed orders. It provides information for various analyses and reporting, such as trend analysis for process and organization improvements. The historical data database 280 may be separated from the order status data database 278 to improve performance and to alleviate confusion that may result from evaluating completed and in-progress orders together. A refining process may be used to de-normalize the historical data database 280 based on any reporting requirements. The historical data database 280 may also store order-related data that needs to be maintained. Alternately, such order-related data may be stored in a separate database to allow management of completed orders and provide for a current view of customers. In some situations, this order data may be combined with other provisioning-related data in a data warehouse.

The database 290 may include an exception data database 282. The exception data database 282 stores exceptions and logging messages and erred events. The exception data database 282 may be implemented in a relational database, file, or in more than one technology. Further, the exception data database 282 may be combined with an enterprise operations event management system, and provide SNMP events. For error or log messages caused by a message within the order manager, the message which caused the error may be stored with the logging message. This may be accomplished by, for example, capturing the message or event in XML format and storing it so it may be review, modified and potentially re-injected back into the order manager 104.

The process creation module 202 generally includes an order decomposition module 210 and a task list management module 280. The order decomposition module 210 acts as a front door, or entrance to the order manager 104 and provides a single point to bring together orders from several different sources such as a customer web site, order entry system, and third party order entry. Generally, an order will be sent as one message. However, if the order is sent as several messages, the order decomposition module 210 may assemble the order prior to processing. In addition, some order mappings, translations, derivations, and/or rules may be applied by the EAI layer. However, if they are not, they may be implemented in the order decomposition module 210 as part of the data mapping.

The order decomposition module 210 generally receives, validates, versions and prepares an order for future processing. More specifically, the order decomposition module 210 decomposes the order into its components and creates a list of the building block needed to provision the order (a "building block list"). The order decomposition module 210 may include an order validation module (not shown) that identifies the order type and whether the order can be provisioned. New orders, requests to cancel an existing order (cancel orders), and requests to change an existing order (supplement orders) are treated as separate order types. New orders, supplement orders and cancel orders are all identified by the order validation module. In addition, supplement orders may be given a version number to relate them to and distinguish them from the existing order they are changing and other supplements to the same order.

The order decomposition module 210 uses reference data from the reference data database 274 to map the order to the appropriate building blocks and determine the validation rules. In addition, the order decomposition module 210 writes data to the order data database 272 and the order status database 278. Errors may be written to the work list 260 for manual processing. However, level 1 validation errors may be written to the exception system 294.

The processes of FIGS. 10-15 will be described generally. However, the steps of these processes may be implemented in conjunction with the system and data structures described above in conjunction with FIGS. 1-9, and reference to aspects of these examples will be made throughout the discussion to follow.

Figure 10:
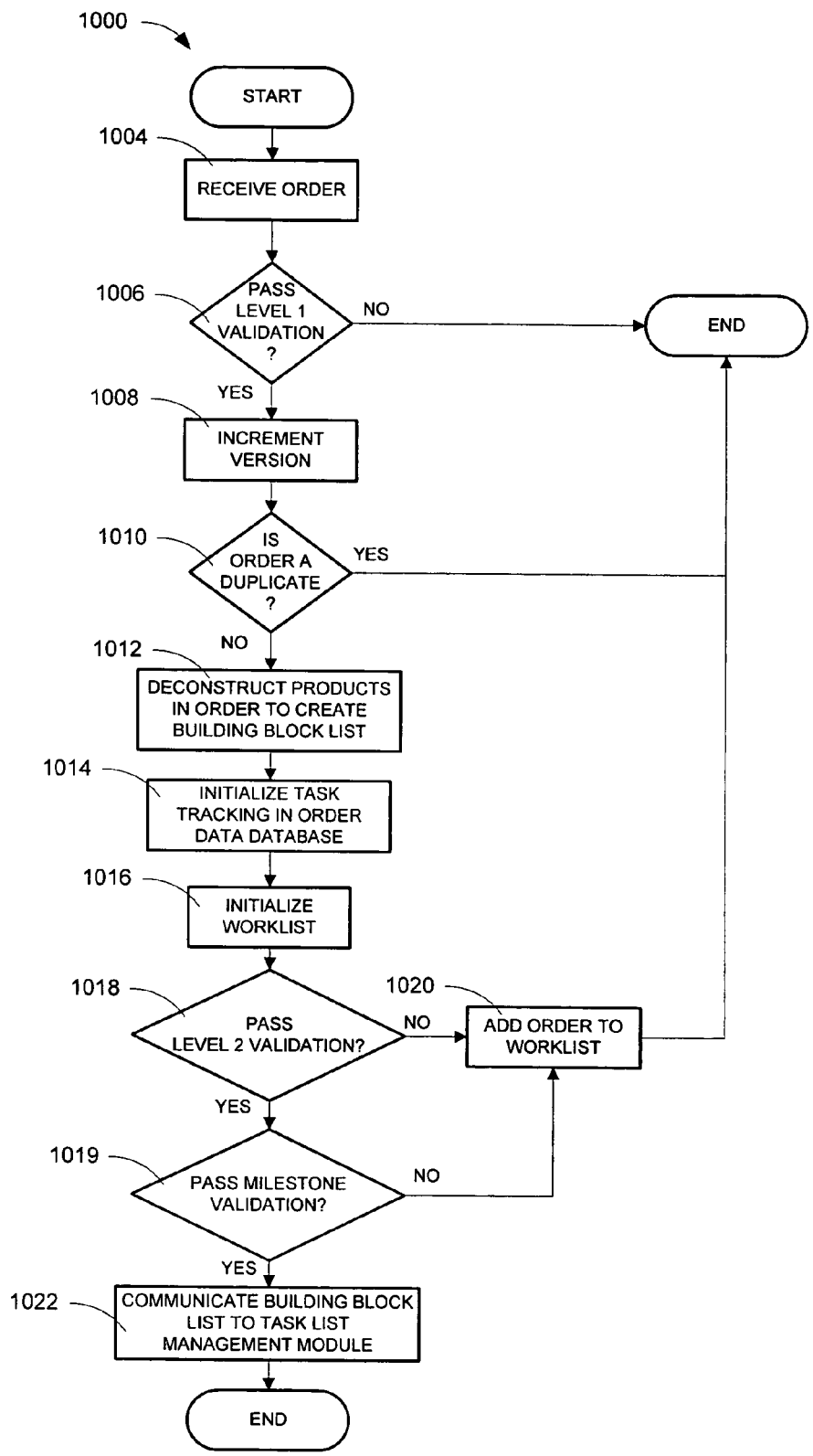
FIG. 10 is a flow chart of an order decomposition method.

An example of a process by which the order decomposition module 210 decomposes an order is shown in FIG. 10. In each step in the process, state and order data may be persisted in a persistence data database to ensure that no information is lost if the system goes down. When the order is received, block 1004, the order type may be stored in the database. For example, if the order is a supplement order or a cancel order, an intent code "supplement" or "cancel" may be entered into the order field in the version status entity of the order status data database. After the order is received, an initial validation ("level 1 validation") is performed 1006. Level 1 validation is a basic validation that determines if an order can be tracked, stored, and displayed in the work list. If an order fails level 1 validation, the order is so mal formed that the work list can not display and/or a user would not be able to understand the order well enough to address the order. Typically, only a few fields of an order, such as, for example, an identification number and customer name are validated. The fields that are to be validated may be identified in the order definition entity of the reference data database. If the order fails level one validation, the order may be sent to the exception management system and logged.

If the order passes level 1 validation, the version number of the order is incremented, block 1008. This version number is used to manage supplement orders that may occur as an order is being processed. The first time an order is received, it is assigned a number such as 1. Subsequently, each time a supplement order relating to the initial order is received, the version of the supplement order is incremented by 1. Duplicates records may also be assigned an incremented version.

The order may be examined to determine if it is a duplicate of an existing order, block 1010. Determining whether an order is a duplicate 1010 helps to eliminate needlessly re-processing orders. In block 1010, each supplement order is compared to the previous non-duplicate version of the order to determine if the supplement order makes any relevant changes to the previous version of the order. In some cases, only predetermined fields may be compared. These predetermined fields may be indicated in the "consider for duplicate field" of the order definition entity in the reference data database. If the order is a duplicate order, it may be sent to the exception system and logged.

Figure 11:
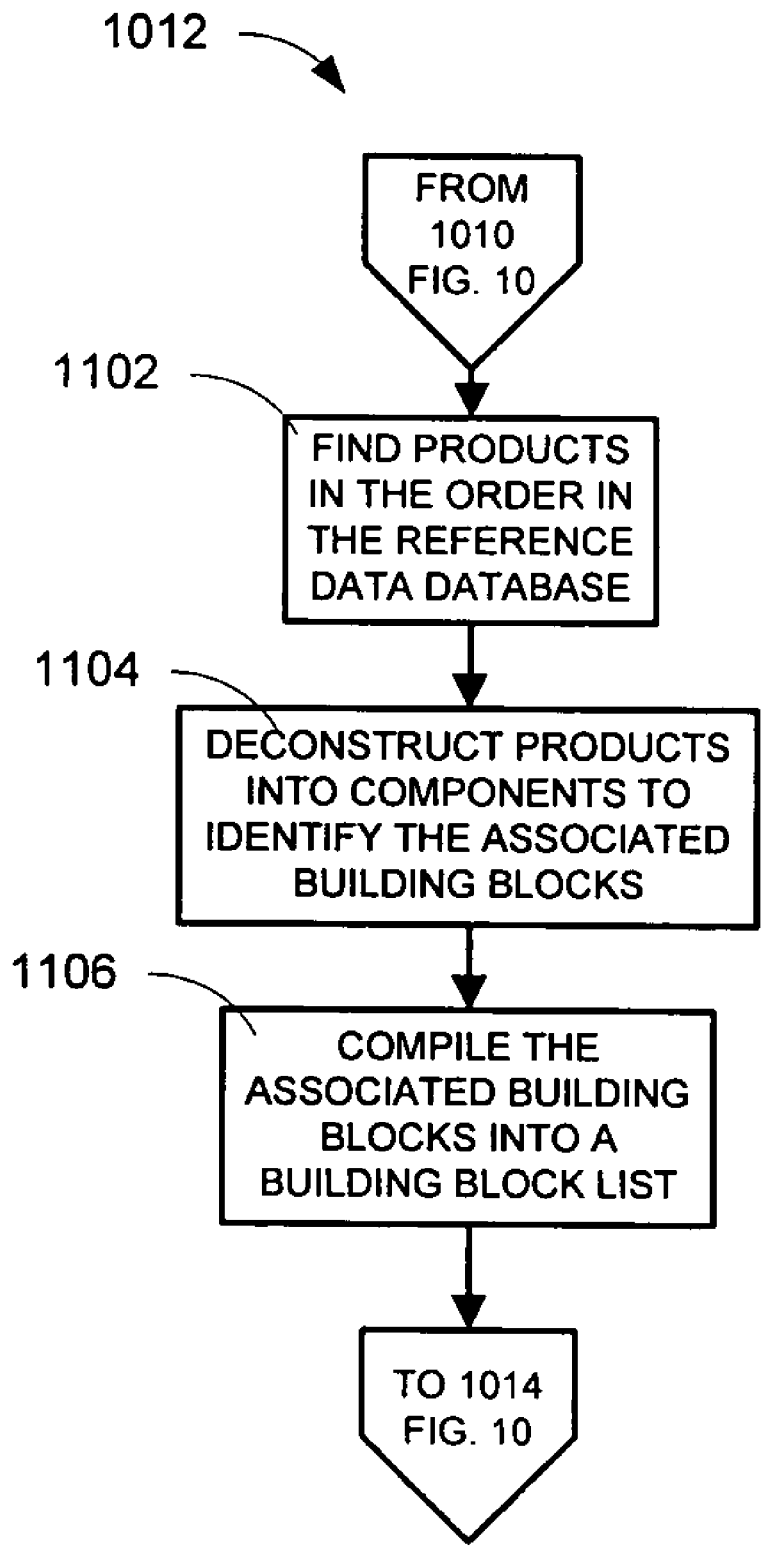
FIG. 11 is a flow chart of an order deconstruction method.

If the order is not a duplicate, the order is deconstructed to create a building block list at block 1012. In some cases, cancel orders are not deconstructed. FIG. 11 shows a more detailed example of the step shown in block 1012. As shown in FIG. 11, deconstructing the order to create a building block list 1012 includes finding the products in the order in the reference data database block 1102. The products may then be deconstructed into their components to identify the associated building blocks 1104 by locating the building blocks associated with the products in the reference data database. The associated building blocks are compiled into a building block list 1106. Deconstructing the order to create a building block list 1012 may further include adding the order to the order database.

Referring to FIG. 10, initializing task tracking in the order status data database 1014 includes adding the order and/or the version number of the order to the order status data database, and may also include adding the relevant validation tasks to the order status data database. When new orders are received, a row may be added to the order status entity. When supplement orders are received, a row may be added to the task status entity for supplement milestone validation (in level 2 validation). When cancel orders are received, a row may be entered into the task status entity table for cancel milestone validation (in level 2 validation). In contrast, when any order is received, a row may be added to the version status entity. The order status will generally remain at its default, such as null or not processing, and may be updated during the creation of the task list.

Prior to any further validation, the work list is generally initialized 1016. This may include removing validation or milestone errors entered into the work list from previous versions of the order. These errors are removed because the new version of the order may correct them. In addition, if the new version of the order does not correct the error, the error will be discovered in the new version and added to the work list.

The work list may be checked for errors using many methods. For example, the order status data database may be examined. In another example, information relating to the work list may be stored in a database. In this case, this database may be queried. Alternatively, the work list may include a webservice that stores information relating to the work list, including validation, milestone and other errors. In this case, the webservice may be accessed to check for errors.

The order may then be subject to further validation. Determining whether the order passes level 2 validation 1018 includes determining whether predetermined fields in the order are required and/or whether the fields have the proper type, length, and domain according to data in the domain field and the order definition entity. If any of the required criteria are not met, the order may be sent to the work list. The predetermined fields may be indicated in the reference data database.

Figure 12:
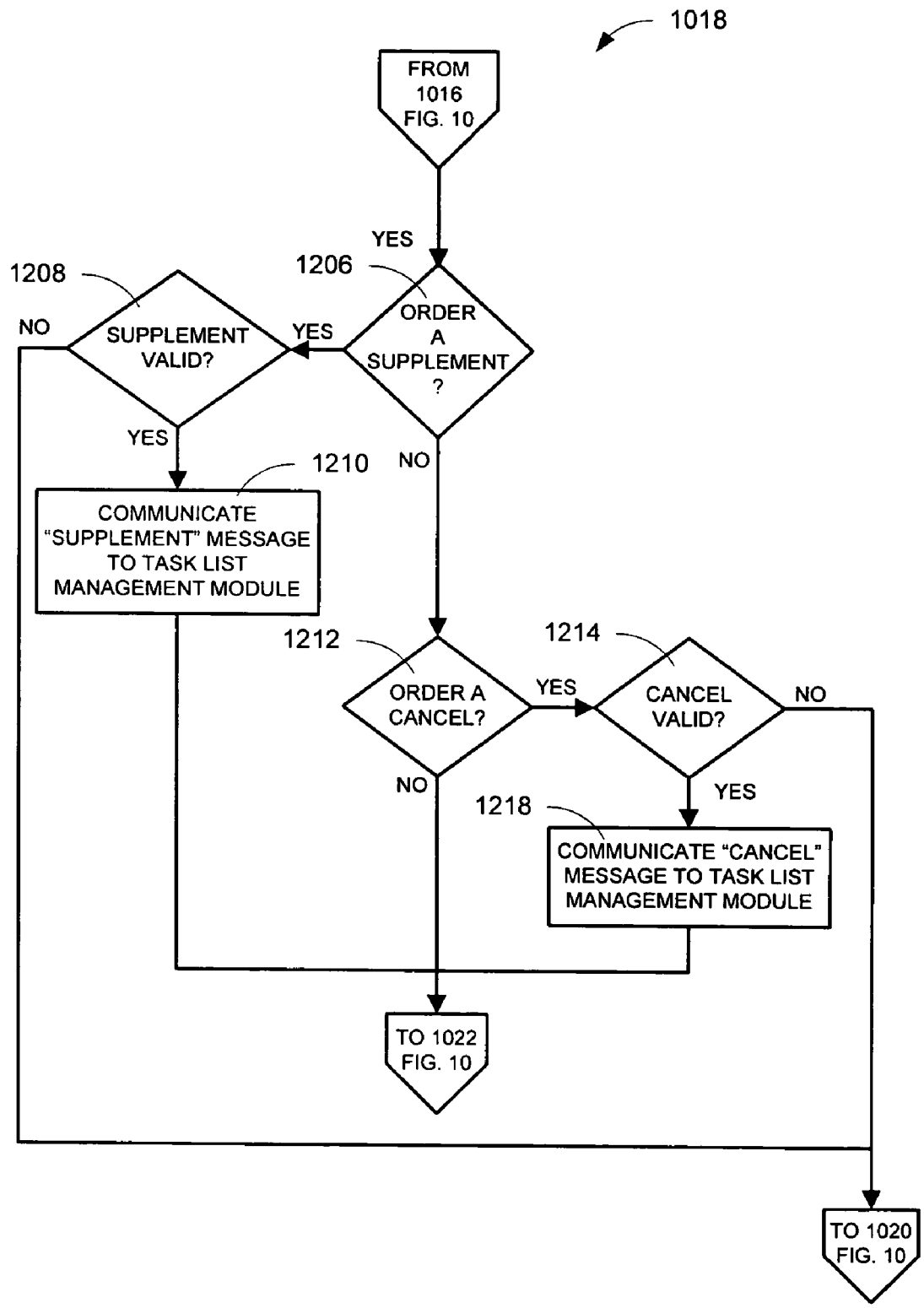
FIG. 12 is a flow chart of an order validation method.

A more detailed example of the step of block 1019, determining whether the order passes milestone validation, is shown in FIG. 12. Milestone validation checks to see if an order has progressed past a milestone, which is a point in the order manager in which a supplement or cancel order can no longer be accepted. Determining whether the order passes milestone validation 1019 includes determining whether the order is a supplement 1206 and whether the supplement order is valid 1208 (supplement milestone validation). Determining whether the supplement order is valid 1208 includes determining whether the order to be supplemented has progressed past the milestone. The milestone may be indicated in the milestone ID field of the milestone entity in the reference data database. If the order to be supplemented has progressed past the milestone, the supplement order is not valid and the order does not pass milestone validation. If the order to be supplemented has not progressed past the milestone, the supplement order is valid and a "supplement order" message may be communicated to the task list management module 1210.

If the order is not a supplement order, a determination is made as to whether the order is a cancel order 1212. If the order is a cancel order, a determination is made as to whether the cancel order is valid 1214 (cancel milestone validation). Determining whether the cancel order is valid 1214 includes determining whether the order to be canceled has progressed past the milestone. If the order to be canceled has progressed past the milestone, the cancel order is not valid and the order does not pass milestone validation. If the order to be canceled has not progressed past the milestone, the cancel order is valid and a "cancel order" message may be communicated to the task list management module 1218.

If a version of an order fails milestone validation, the order may be allowed to complete, and an unrelated order may be created to implement the supplement or cancel. Alternatively, the invalid order may be added to the work list. Additional milestones may be defined as needed.

Referring again to FIG. 2, the order decomposition module 210 sends a message to the task list management module 280 instructing the task list management module 280 to process the order. The message may contain a mapped copy of the order and its associated building block list, or if this information is saved in the order data database, a provisioning request for the source, order ID, version and intent.

The task list management module 220 is responsible for managing the order level components. In general, the task list management module 220 creates task lists, queues supplements, updates the order status and manages cancels. To create a task list, the task list management module 220 generally identifies the appropriate group of tasks associated with each of the building blocks indicated in the building block list, and creates a task list identifying these tasks. This task list defines a process for provisioning the order, including canceling an order. A task list for a cancel order, however, may be created without creating a building block list. The task list for a cancel order may be created by determining which tasks have been provisioned and undoing them.

The task list management module uses data from the reference data database 274 to create the initial task list, as well as supplement and cancel task lists. In addition, the task list management module may read the order status data database 278 to determine the current state of tasks, and may update the order status data database 278 with a task list, current task flag and order status information.

Figure 13:
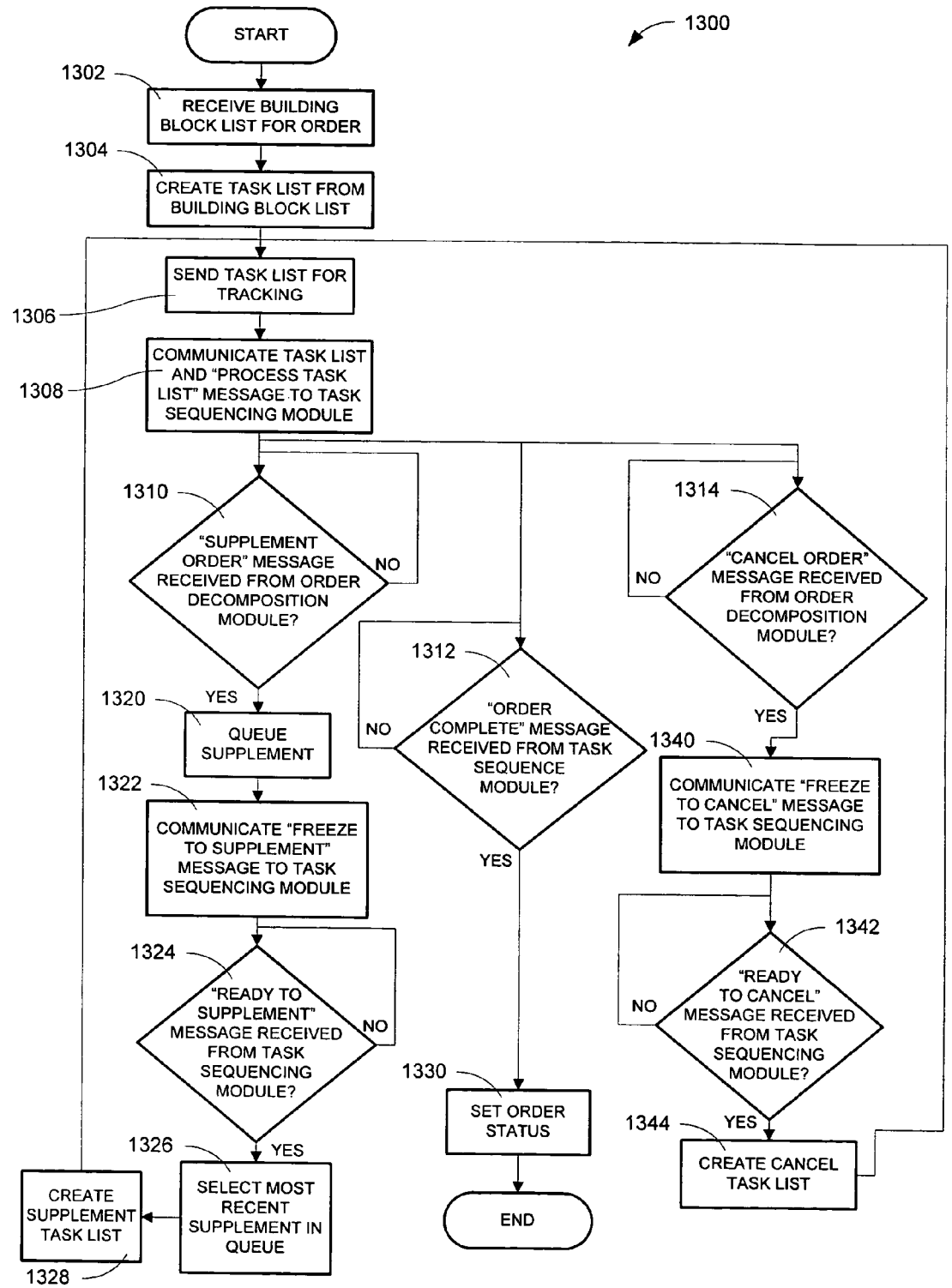
FIG. 13 is a flow chart of a task list management method.

A process by which the task list management module 220 creates and manages a task list is shown in FIG. 13. According to this task list management method 1300, the task list management module receives the building block list for the order 1302 from the order decomposition module. Alternatively, the task list management module may receive a request for provisioning from the order decomposition module. A request for provisioning is generally a request for an order which is not currently processing in the order manager. It will usually be version 1 of an order, however if there is a validation error, it may be a different version.

The task list is then created from the building block list 1304. The task list creation may be accomplished in the application layer or according to a procedure stored in the database. For each of the top level building blocks, a list of tasks may be generated by querying the building block entity in the reference data database. The relationship among the top level building blocks and the child building blocks may be retrieved from the building block hierarchy entity and the dependent relationship among the building blocks may be retrieved from the building block dependency entity.

A complete task list may be created by navigating through all the dependencies until all the root building blocks have been identified. All the root building blocks have tasks associated with them. Based on the action associated with a particular building block, the tasks and task dependencies can be determined. This process is done for each building block in an order, even if the same order includes duplicate building blocks. The task list may be created recursively or in a simple loop. In either case, the relationship among the building blocks and tasks and among the child and parent building blocks should be maintained.

Creating the task list 1304 may also include merging the tasks in the task list. Merging the task list includes determining which, if any, tasks should be merged. This includes identifying tasks in the task list that are to be performed simultaneously and can or should only be performed once. More specifically, the tasks which occur more than once are identified, a determination is made as whether they are in parallel or part of a process in which they depend on each other. If the tasks are parallel, the task sequencing module looks to the "merge required" field in the task definition entity in the reference data database to identify the appropriate activity for merging. If, for example the merge required field contains "Yes," the task sequencing module is required to merge the tasks. Alternately, if, for example, the merge required field contains "Not Allowed," the tasks may not be merged. Further, for example, if the merge required field contains "No," merging is optional. After determining whether to merge the tasks or not, a merge level is determined. The tasks may be merged on various levels such as order level and site level. The merge level is generally indicated in the merge level field of the task definition entity in the reference data database.

After the task list has been created 1304, it is sent for tracking 1306. This includes sending the task list to the database to track the status of each task in the task list. Additional data from the task definition entity may be included in the task list (or added during insert) to aid in reporting. Predictive reports can be created based on the task list and associated dependencies stored in the database. The tasks in the task list are added to the task status entity and the dependencies of the tasks in the task list are added to the task dependency status entity.

Sending the task list for tracking 1306 also includes updating the order status. If the task list is for a new order, the order status may be updated to "in progress" when the tasks are entered into the database. In contrast, if the task list is associated with a cancel order (as indicated by the intent of the task list), the order status may be updated to "in progress—canceling" from an initial status of "not ready to be worked."

The task list management module communicates the task list and a message, such as "process task list" to the task sequencing module. This prompts the task sequencing module to start processing the task list. Alternatively, only the message may be sent. In this case, the task sequencing module retrieves the task list from the database. The task list management module then waits for an "order complete," "cancel order," or "supplement order" message 1312, 1314, and 1310, respectively.

If the task list management module receives an "order complete" message from the task sequencing module, it ends the processing because the order has been provisioned. In general, the task list management module updates the order status in the order status data database to "complete." The task list management module may also terminate any processes that may still be active for the completed order. In addition, the task list management module may delete any data that is not required for historical reporting, or to be saved for another purpose. The task list management module may also move other data to the historical data database, or place it in a ready state for a batch process/ETL tool.

If the task list management module receives a "cancel order" message from the order decomposition module, it sends a message to the task sequencing module, such as "freeze to cancel," 1340. This message instructs the task sequencing module to place the tasks in a ready-to-cancel state. When the tasks are in a ready-to-cancel state, the order is in a state in which a cancel task list may be processed. The task list management module then waits for a message from the task sequencing module, such as "ready-to-cancel" 1342, which indicates that the task may be cancelled.

The task list management module then creates a cancel task list 1344, which includes the tasks needed to cancel the order. The cancel task list may be created by looking at the latest version of completed tasks and determining what, if anything needs to be reversed to make the environment appear as if the order never happened. The cancel task list may then be sent for tracking 1306 and the process repeats as appropriate.

If the task list management module receives a "supplement order" message from the order decomposition module, it queues the supplement 1320 and sends a message to the task sequencing module, such as "freeze to supplement" 1322. Queuing the supplement 1320 includes placing the supplement in storage so the task list management module can continue to listen for additional supplements and cancels while the system readies itself to process the supplement. Sending the message to the task sequencing module instructs the task sequencing module to prepare the currently processing tasks for a supplement.

The task list management module then waits for a message, such as "ready-to-supplement" from the task sequencing module 1324 indicating that the task sequencing module is ready to process the supplement. The most recent version of the supplement is selected 1326. Because the most recent version of the supplement in the queue has the current view of the entire order, and may be used to determine what needs to be provisioned and de-provisioned from the previous order, it is generally the supplement chosen for processing. Selecting the most recent supplement generally requires looking at the supplement queue because the order status data database could be misleading. The order status data database may be misleading because, although it may include a more current supplement, this more current supplement may have a validation or milestone issue, making it unsuitable for processing.

If, while the most recent supplement is being processed a cancel order is received, the task list management module may still need to communicate the supplement to the task sequencing module. This is due to the differences between the activities associated with a "freeze to cancel" and a "freeze to supplement."

After the most recent supplement has been selected 1326, a supplement task list is created 1328. After the task list has been created the tasks may be merged in a similar manner to the previous task. The supplement task list may be created in a manner similar to the manner in which the original task list was created with some exceptions. For example, tasks that were completed on a previous version need to be examined to see if they need to be undone or re-done based on the changes in the task lists and order. The supplement type may be used to determine the tasks that need to be redone and undone. In addition, the rules for undoing and redoing tasks may be retrieved from the task definition and supplement type entities. In order to understand the changes and supplement type, a comparison between the current data and previously processed data may be required. However, a task by task comparison of the data with the data associated with the previous version of the order is likely to be required for each task completed. This task-by-task comparison is generally performed as part of creating the supplement task list 1328.

Another example of the way in which the creation of a supplement task list differs from that of the original task list is that some tasks may stay in progress on a previous version. In this situation, the previous version of the task should be included in the current task list, while continuing to be referred to in the previous version. After the supplement task list is created 1328, the supplement task list may be sent for tracking 1306, and the process may repeat as appropriate.

The process management module 230 receives the task list from the task list management module and generally includes a task sequencing module 244 and a task management module 238. The task sequencing module 244 generally receives the task list from the process creation module 280 and manages the task list ensuring that each task is completed in the appropriate sequence. The task sequencing module 244 processes at the task list level, which is roughly equivalent to the order version level.

A task list generally includes tasks (or pointers to tasks), and their hierarchical relationship among each other. The task list is generally stored in the order status data database. However, the task sequencing module 244 may maintain its own task list from which it will work. In some instances, task lists may include items from different versions of tasks. This generally happens when changes to an order occur that do not affect the currently processing tasks. In these instances, the task sequencing module 244 does not stop processing the current tasks because the tasks will be completed on the version in which they began. It is possible for a timing gap to occur when a process is frozen and a task for a previous version, which was allowed to continue, completes prior to the creation of a new task list. In this scenario, a "complete" message from the task management module 238 would reach the task sequencing module 244 and be sent to the exception system 294 because there would be no process with which to associate the message. Although this is not likely to happen, a monitoring process could monitor for this situation and alert the system or its administrator to resend the message (or invoke a similarly-reactive automated scenario). Alternatively, a process could accept the message and wait for a message from the task list management module 220 to invoke the task list.

Figure 14:
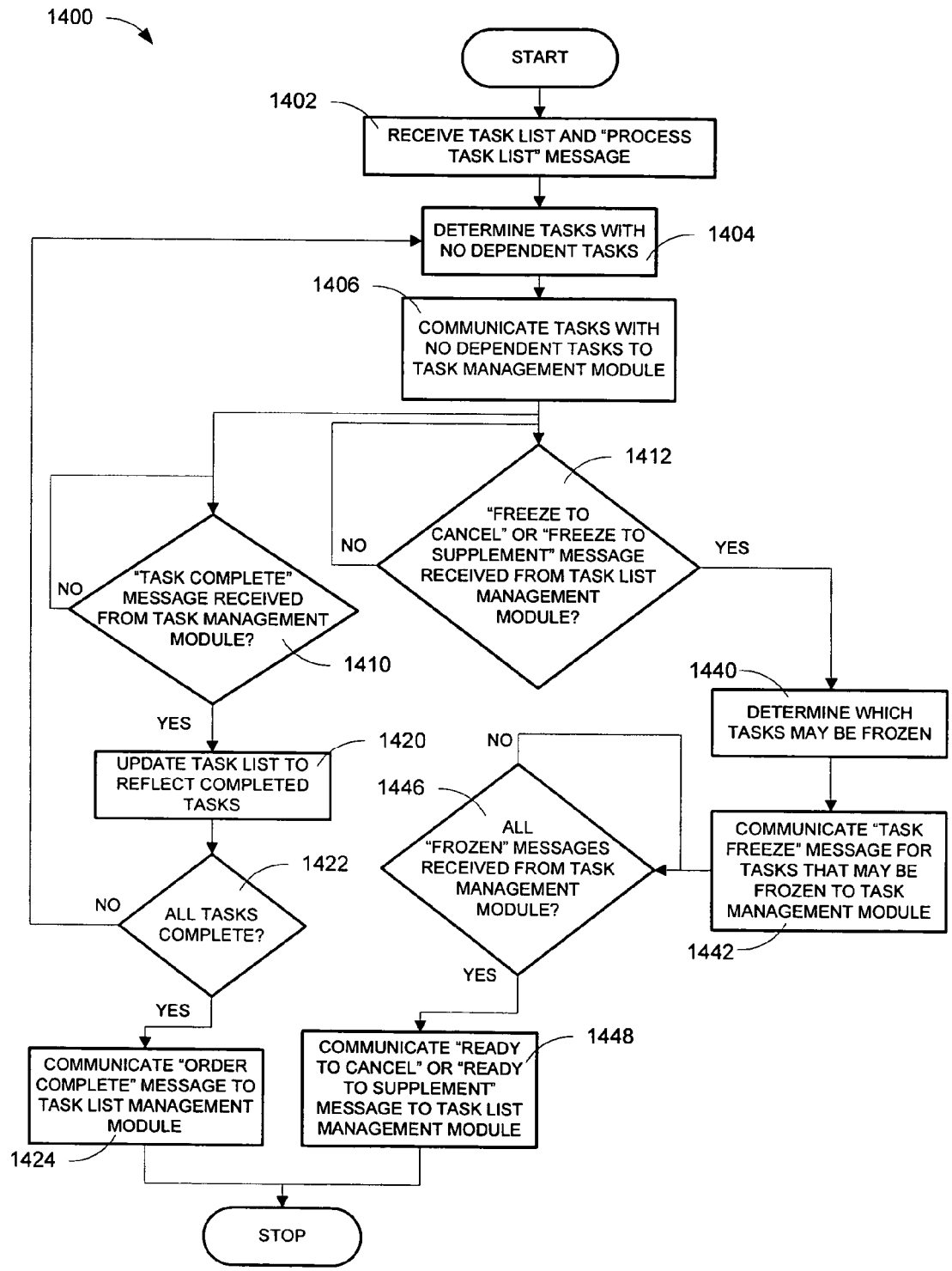
FIG. 14 is a flow chart of a task sequencing method.

An example of a method according to which the task sequencing module 244 sequences the tasks in a task list is shown in FIG. 14. According to this task sequencing method 1400, the task sequencing module receives the task list and a "process task list" message (or just the message) from the task list management module 1402. The task sequencing module then determines which of the tasks have no dependent tasks 1404 and sends the tasks with no dependent tasks (and which are not already completed or being processed) to the task management module 1406. This step may be thought of as a mini process because it requires looping through the tasks and may involve sending several messages to process a task. Because this "mini process" is part of a larger loop, it may be invoked when there are no messages to be sent. In this case, the method 1400 should continue.

The task sequencing module then listens for messages from the task management module, such as a "freeze to cancel" or "freeze to supplement" 1412, or a "task completed." If a "task completed" message is received, the task list is updated to reflect the completed task 1420. However, this step can be avoided if the order status data database is used to track the order and the task list. However, in many cases, a separate task list will be maintained by the task sequencing module.

The task sequencing module determines whether all tasks in the task list are complete 1422. If all tasks are complete, a message is sent to the task list management module, such as "order complete," indicating that all the tasks are complete 1422. If, however, all the tasks are not complete, the tasks without any dependent tasks (which are also not complete or in process) are identified 1404 and the process repeats.

The task sequencing module simultaneously listens for a "freeze to cancel" or a "freeze to supplement" message. These messages be received at any time during the provisioning of an order, and may be received in the multiple. Multiple messages may be received in situations where a "freeze to supplement" is received and a "freeze to cancel" is received shortly thereafter. If the freeze activities for the supplement and the cancel are not compatible, the task list management module may be modified to prevent this. If, however, the freeze activities for the cancel and supplement are the same or very similar, the "freeze to cancel" may be sent to the exception system 294. In addition, the task list management module may be modified to treat the "ready to supplement" message as a "ready to cancel" message. Alternatively, this scenario may be handled by an application support team.

When a "freeze to cancel" or a "freeze to supplement" message is received, a determination is made as to which of the tasks may be frozen 1440. Not all tasks are required to be frozen. Only the tasks that are managed by the task status manager require attention. Of these tasks, only those that cannot remain in progress during the next version of the order should be frozen. This can be complicated to figure out and may require additional information about the changes made to the order. This information may be found by examining the supplement type in the order data database or may be included in the "freeze to cancel" or the "freeze to supplement" request.

After the tasks which may be frozen have been identified 1440, a message, such as a "task freeze" message, is sent to the task management module for each task that is to be frozen 1442. The freeze activity may be included in the message or accessed from the database by the task management module.

The task sequencing module then listens for a message, such as a "frozen" message, indicating that the tasks have been frozen, from the task management module 1446. In some cases, the task may complete before it is frozen. In these cases, a "frozen" message is not required for the completed task. Once all the tasks have been frozen, which effectively freezes the order, a message, such as "ready to cancel" or "ready to supplement" is communicated to the task list management module.

Referring again to FIG. 2, the task management module 238 manages the provisioning of the tasks. Task provisioning is managed according to task-related information stored in the reference data database 274. The task management module 238 sends tasks to a downstream system, such as an automatic order provisioning system, for automatic provisioning, or the work list for manual provisioning. The downstream system may be another module within the order manager 104 that performs specific logic and/or activities. After sending tasks for processing, the task management module 238 waits for a status to be entered into the order status data database 278. When the task management module 238 reads a "complete" status, it terminates the process. A complete message may be returned to the task management module 238 or other calling system if a return of this message is requested when the provisioning request is sent to the order manager 104.

An example of possible statuses includes: "complete," "resubmit," "error" and "ready to be worked." Additional statuses and actions can be added as required. Examples of additional statuses include: a "reject" status to indicate that an order should be placed in a held state, an "in-progress" status, and a "checked out" status. In addition, there may be statuses for which no action other then to record the status to the order status data database 278, is required. These statuses are generally informational only and may include "status effective date," "comment," "error number," and "error description." These statuses may collectively be referred to as "informational statuses."

In addition, the task management module 238, instead of the order decomposition module 210, may manage order validation. In this case, the task management module 238 may forward the validation tasks to a validation model, which would validate the order and return a "complete" or "error" message to the task management module in a manner similar to other automated tasks. One advantage to this approach is that the status for validation tasks would be consistent with other tasks in the system.

Figure 15:
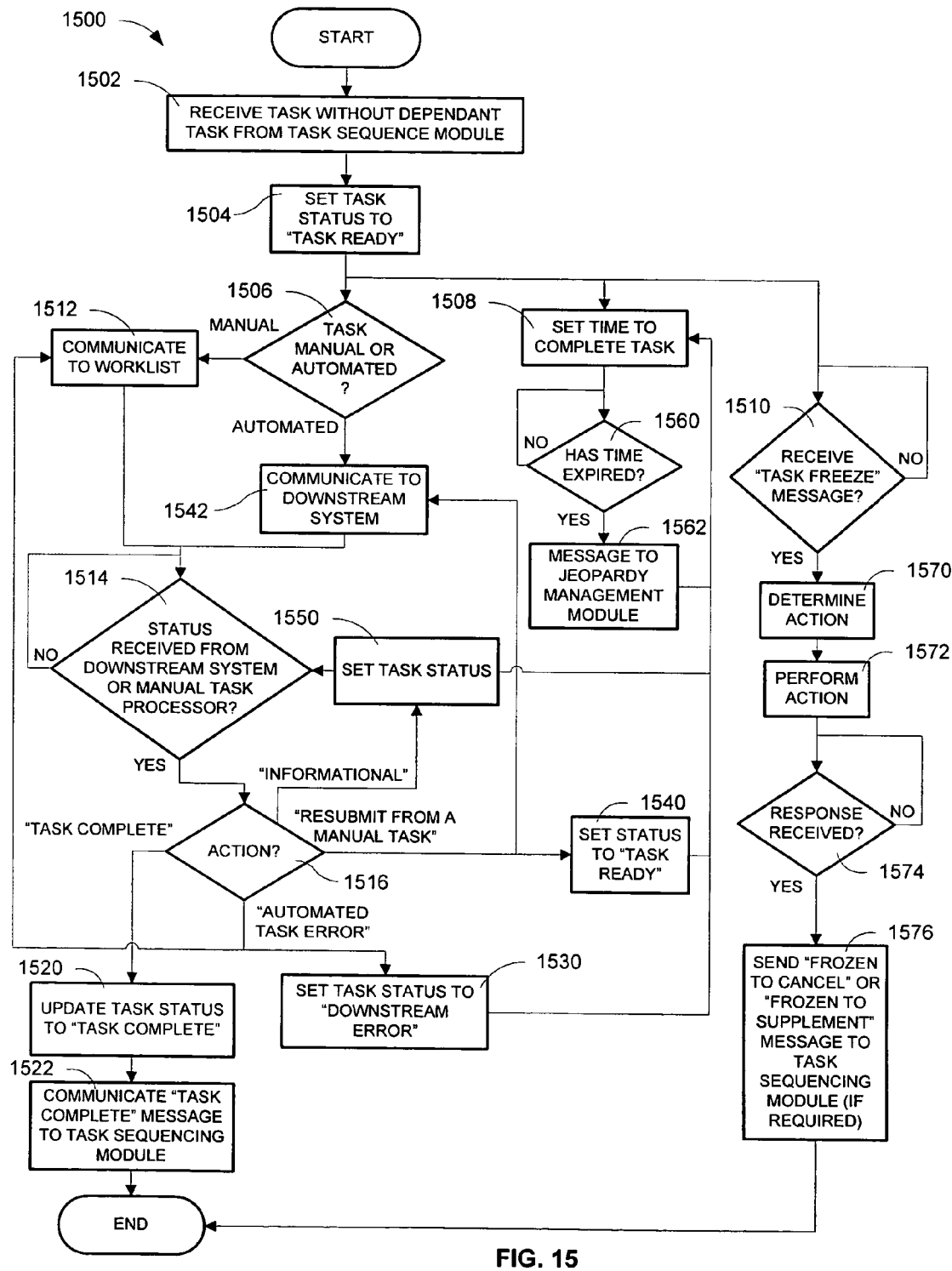
FIG. 15 is a flow chart of a task management method.

A method according to which the task management module 238 may manage task provisioning is shown in FIG. 15. According to this task management method 1500, the task management module receives a task from a calling module, such as the task sequencing module, the identity of which may be noted. In addition, the message to provision a task may include information about whether to send a status back to the calling module.

Once a task or tasks is received 1502, the task status in the order status data database is set to "task ready." The task ready status indicates that the task provisioning process has started. It may then determine whether the task is an automated or manual task 1506. If the task is an automatic task, a provisioning request is communicated to a downstream system 1542. The downstream system may be an automatic order processing system, which may include another order manager. If, however, the task is a manual task, it is sent to the work list.

After the task is communicated to either a downstream system or a work list, the task management module listens for a status. This status may be communicated by the downstream system or the work list. The task management module may continue to listen for messages until a "complete" message is received or the task management method is terminated for other reasons.

After a status is received, an action to be taken is determined 1514. The action to be taken is determined according to the status received. If the status received is "informational," the action to be taken includes setting the task status (in the order status data database) to "informational." Because the "informational" status is merely a term used to describe statuses not otherwise defined, the actual status received is sent to the database, not "informational." If the status received is an "automated task error" status, the status "downstream error" is published to the order status data database 1530.

If the status received is a "resubmit," which is generally received in connection with an automated task that has erred and, as a result, become a manual task, the status "task ready" is published to the order status data database 1540 and the automated provisioning may start over.

In this method 1500, a timer may be set for many things, including to measure intervals for the entire provisioning process, and intervals for a specific status. The timer may, for example, be set after the task status is set to "task ready" in steps 1504 and 1540. To set a timer, a time to complete the task is set 1508, and monitored 1560 until the time set has expired. Setting the timer includes terminating any existing timers whenever a status change takes effect. The times to complete a task are determined from the task interval field of the task definition table of the reference data database. Additional times to complete a task may be defined in the task definition table by adding additional fields and making modifications to the set time to complete task step 1560. For example, a time interval indicating the number of days before the order is due by which the task must be completed may be added to the task interval field of the task definition entity. In this case, the set timer to complete task 1508 may include determining the number of days until the task must be completed according to the difference between an internal system date and the due date of the order minus the task interval value.

After the time has expired, a message is sent to the jeopardy module (290 FIG. 2), and without waiting for a response from the jeopardy module, the timer is reset. The task management module may continue to listen for status messages after a timer has expired. However, in some situations, after a timer expires, it may be too late to receive a status. In these cases, the task management module may need to terminate the instance. In general, all timers are terminated when the instance of the process is terminated.

Returning to step 1516, if a "task complete" status is received, the "complete" status is published to the order status data database 1520. In general, the "task complete" status is the final task status that the order status data database receives for a task. In addition, a "task complete" message is sent to the task sequencing module.

The task management method 1500 may also include continually listening for messages from the task sequencing module indicating that a task is to be frozen, such as a "task freeze" message 1510. When such a message is received, a determination is made regarding the appropriate action to take 1570. Determining which action to take 1570 may be based on information in the reference data database, particularly the task definition entity. Generally, only a limited number of actions are identified. Therefore, if additional actions are needed, they may be added to the task management module in a manner similar to the currently defined actions.

Examples of actions that may be selected include: remove from work list regardless of state, wait for task to complete, remove from work list when released, and send system message. The "remove from work list regardless of state" action includes sending a message to the work list instructing it to remove the task regardless of whether the task has been placed into a status, such as "in-progress" that allows the task to be accessed only by a party performing the manual provisioning. When a task has been placed into an "in-progress" status, it has been placed into a "checked-out" state. This action may be used to pull validation and milestone errors off the work list during order decomposition. It may also be used as part of the clean-up process. However, using this action may make it difficult to determine whether to process a supplement or cancel order because the status of the task remains that which the task had when it was removed from the work list. Therefore, if the task had an "in-progress" status (was placed into a "checked-out" state) when it was removed from the work list, the order manager may not know if the task has been started or completed. The "remove from work list when released" action is similar to the "remove from work list regardless of state" action, except that the "remove from work list when released" action only occurs when a task is not checked out, or when a checked-out task is released from the work list.

The "wait for task to complete" action includes waiting for the task to complete and then following the normal processing path to terminate the instance and return a complete to the calling system. The "send system message" action sends a message to the downstream system action provisioning the task. This message instructs the downstream system to put the task in a "ready to supplement" or "ready to cancel" state.

After the action is selected, the selected action is performed 1572. The task management module then listens for a response 1574 from the work list or downstream system. For example, if the action taken was a "send system message," the response anticipated is a response indicating that the task is in a "ready to supplement" or "ready to cancel state." Further, if a response indicating that the task is in a "ready to supplement" or "ready to cancel state" is received, the task management module sends a "frozen to cancel" or "frozen to supplement" message, respectively.

Referring again to FIG. 2, the order manager may include a jeopardy module 292. One example of a jeopardy module 292 includes a task-based jeopardy module 292 that is used when a timer expires in the task management module 238. In this example, order level due dates may be handled by a reporting system or other jeopardy modules based on information in the order status data database 278. Additional order jeopardizes may be included in a similar manner.

The order manager may include an exception system 294, which handles malformed or unplanned messages generated by the order manager 104 or external systems. The exception system 294 controls the storage exceptions and logging messages and erred events in the exception data database 282. The exception system 294 may simply receive the error or log messages and write them to a log file, store them in a database or send them to other systems for processing. Alternately or in addition, the exception system 294 may capture the errant events, send alarms, allow the correction or updating of messages, and re-issue the messages. For error or log messages caused by an event, the exception system 294 may capture the message or event in XML format and store the message or event in the exception data database 282.

The order manager may include a report engine 292. The report engine 292 may create virtually any type of report relating to the activities of the order manager 104 and/or an order management system. The report engine 292 uses information stored in the order status data database 278 to create reports. However, the report engine 292 may also or alternatively use information stored in a historical data database. The report engine 292 may be built on technologies, such as Crystal Reports, Business Objects, and Microsoft's Reporting Services, Brio and Actuate.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus for managing an order having a plurality of components, the apparatus comprising:

a database, comprising:

a plurality of tasks, each task defined by a task entity class stored in the database, the task entity class including a task status entity storing a jeopardy action status interval and a jeopardy action entity storing information relating to activities that are to be performed if a duration defined by the jeopardy action status interval of the task status entity is exceeded;

a plurality of building blocks;

a process creation module in communication with the database and configured to create a process for managing the order that comprises a subset of the plurality of tasks, and comprising:
- an order decomposition module in communication with the database and configured to decompose the order into at least one of the plurality of building blocks to create a building block list, the order decomposition module comprising an order validation module to identify an order type for the order and to determine whether the order can be provisioned, the order decomposition module using data from the database to decompose the order into the at least one of the plurality of building blocks and to determine order validation rules for the order validation module; and
- a task list management module in communication with the order decomposition module and configured to create a task list identifying the subset of the plurality of tasks according to the building block list;

a process management module in communication with the process creation module, configured to communicate the process to a system to enable processing of the order, and comprising:
- a task sequencing module in communication with the task list management module and configured to determine when one of the subset of the plurality of tasks is to be communicated; and
- a task management module in communication with the task sequencing module and configured to communicate the one of the plurality of tasks to the system to enable processing of the order, the task management module including a timer to time a status interval for performing a designated task of the plurality of tasks; and a jeopardy module in communication with the process management module and responsive to expiration of the timer for performing the activities defined by the jeopardy action entity to be performed when the designated task has not been completed and the duration defined by the jeopardy action status interval of the task status entity is exceeded.

2. An apparatus for managing an order, comprising:

a database;

a plurality of tasks stored in the database, the plurality of tasks including automatic tasks to be completed automatically and manual tasks to be completed manually, each task defined at least in part by a task status entity storing a jeopardy action status interval and a jeopardy action entity storing information relating to activities that are to be performed if a duration defined by the jeopardy action status interval of the task status entity is exceeded;

a process creation module in communication with the database and configured to create a process for managing the order that comprises a subset of the plurality of tasks;

a process management module in communication with the process creation module and configured to communicate the process to a system to enable processing of the order, the process management module configured to identify the manual tasks that are to be provisioned manually and the automatic tasks that are to be provisioned automatically; and a jeopardy module in communication with the process management module and responsive to expiration of a process timer for performing the activities defined by the jeopardy action entity to be performed when the designated task has not been completed and the duration defined by the jeopardy action status interval of the task status entity is exceeded.

3. The apparatus of claim 2, further comprising a plurality of building blocks stored in the database.

4. The apparatus of claim 3, wherein the process creation module includes an order decomposition module configured to decompose the order into at least one of the plurality of building blocks to create a building block list.

5. The apparatus of claim 4, wherein the order decomposition module is further configured to decompose at least one of the plurality of building blocks into a plurality of second building blocks.

6. The apparatus of claim 4, wherein the process creation module further comprises a task list management module configured to create a task list comprising the subset of the plurality of tasks according to the building block list.

7. The apparatus of claim 4, wherein the order decomposition module further comprises an order validation module.

8. The order manager of claim 2, wherein the process management module comprises a task sequencing module configured to determine a sequence according to which the subset of the plurality of tasks are to be communicated to the system.

9. The order manager of claim 8, wherein the process management module comprises a task management module configured to communicate the subset of the plurality of tasks to the system according to the sequence.

10. The apparatus of claim 9, wherein the task management module is further configured to determine whether one of the subset of the plurality of tasks includes an automatic task.

11. The apparatus of claim 10, wherein the task management module is further configured to communicate the one of the subset of the plurality of tasks to an automatic system, if the one of the subset of the plurality of tasks is the automatic task.

12. The apparatus of claim 9, wherein the task management module is further configured to determine whether one of the subset of the plurality of tasks includes a manual task.

13. The apparatus of claim 12, further comprising a manual system, wherein the task management module is further configured to communicate the one of the subset of the plurality of tasks to the manual system, if the one of the subset of the plurality of tasks is the manual task.

14. The apparatus of claim 2, wherein the process creation module comprises computer-executable instructions implemented in a computer-readable medium, the computer-executable instructions defining logic for creating a process for managing the order that comprises a subset of the plurality of tasks.

15. The apparatus of claim 2, wherein the process management module comprises computer-executable instructions implemented in a computer-readable medium, the computer-executable instructions defining logic for communicating the process to a system for processing the order.

16. The apparatus of claim 2, wherein the process creation module comprises computer-executable instructions implemented in an electromagnetic signal, the computer-executable instructions defining logic for creating a process for managing the order that comprises a subset of the plurality of tasks.

17. The apparatus of claim 2, wherein the process management module comprises computer-executable instructions implemented in an electromagnetic signal, the computer-executable instructions defining logic for communicating the process to a system for processing the order.

18. The apparatus of claim 4, wherein the database comprises a data structure that is based on a database and comprises:
- a task entity class configured to store a plurality of task-related data objects;
- a building block entity class configured to store a plurality of building block-related data objects; and
- an order mapping entity class configured to store a plurality of order mapping-related data objects and comprising a building block mapping table entity configured to create a relationship between one of the plurality of building block data objects and one of the plurality of order data objects; wherein the building block entity class comprises a building block task mapping data entity configured to create a relationship among one of the building block-type data objects, one of the order mapping-related entities, and one of the task-related entities.

19. A method for order management, the method comprising:
- providing a database comprising a plurality of building blocks and a plurality of tasks, the plurality of tasks including a task status entity storing and a jeopardy action entity storing information relating to activities that are to be performed if a task has not been completed;
- providing a process creation module configured to create a process for managing the order that comprises a subset of the plurality of tasks, including providing an order decomposition module configured to decompose the order into the at least one of the plurality of building blocks to create a building block list, and providing a task list management module configured to create a task list comprising the subset of the plurality of tasks according to the building block list;
- providing a process management module configured to communicate the process to a system to enable processing of the order; and
- providing a jeopardy module in communication with the process management module and responsive to expiration of a status interval timer for performing the activities defined by the jeopardy action entity to be performed when a designated task has not been completed as indicated by expiration of the status interval timer.

20. The method of claim 19, wherein providing the process management module further comprises providing a task sequencing module configured to determine a sequence in which the subset of the plurality of tasks are communicated to the system.

21. The method of claim 20, wherein providing the process creation module further comprises providing a task management module configured to communicate the plurality of tasks to the system according to the sequence.

* * * * *

UNITED STATES PATENT AND TRADEMARK OFFICE
CERTIFICATE OF CORRECTION

PATENT NO. : 7,469,219 B2                                              Page 1 of 1
APPLICATION NO. : 10/879368
DATED         : December 23, 2008
INVENTOR(S)   : Nathan D. Goldberg It is certified that error appears in the above-identified patent and that said Letters Patent is hereby corrected as shown below:

In the Specification

In column 8, line 41, after "Sonnet/" replace "A" with --$\lambda$--.

In column 8, line 45, before "which include" replace "310," with --302,--.

In column 8, line 56, before "440" replace "VoIP" with --VoIP--.

In column 10, line 34, after "interval field is" replace "exceed" with --exceeded--.

In column 12, lines 11-12, after "building block" replace "depends n." with --depends.--.

In column 12, line 29, after "primary" delete "and".

In column 13, line 15, after "replace such" delete "data" (first occurrence).

In column 15, line 61, before "278" replace "base" with --database--.

In column 17, line 4, after "data objects," replace "respectfully" with --respectively--.

In column 19, line 31, before "that the work" replace "mal formed" with --malformed--.

In column 26, line 14, after "to a validation" replace "model" with --module--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,469,219 B2 | Page 1 of 1 |
| APPLICATION NO. | : 10/879368 | |
| DATED | : December 23, 2008 | |
| INVENTOR(S) | : Goldberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this
Seventh Day of August, 2012

David J. Kappos
*Director of the United States Patent and Trademark Office*